United States Patent
Kashiwagi et al.

(10) Patent No.: US 9,557,571 B2
(45) Date of Patent: Jan. 31, 2017

(54) LIQUID CRYSTAL LENS DEVICE, IMAGE DISPLAY APPARATUS, DRIVE DEVICE, AND DRIVE METHOD

(71) Applicant: Kabushiki Kaisha Toshiba, Tokyo (JP)

(72) Inventors: Masako Kashiwagi, Yokohama (JP); Shinichi Uehara, Tokyo (JP); Ayako Takagi, Yokosuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 316 days.

(21) Appl. No.: 14/296,720

(22) Filed: Jun. 5, 2014

(65) Prior Publication Data
US 2014/0285741 A1    Sep. 25, 2014

Related U.S. Application Data

(63) Continuation of application No. PCT/JP2011/078309, filed on Dec. 7, 2011.

(51) Int. Cl.
*G02F 1/1335* (2006.01)
*G02B 27/22* (2006.01)
(Continued)

(52) U.S. Cl.
CPC ............ *G02B 27/2214* (2013.01); *G02F 1/29* (2013.01); *G09G 3/003* (2013.01);
(Continued)

(58) Field of Classification Search
CPC ................................................ G02B 27/2214
USPC ......................................................... 349/15
See application file for complete search history.

(56) References Cited

U.S. PATENT DOCUMENTS

2008/0266387 A1    10/2008   Krijn et al.
2010/0157181 A1*    6/2010   Takahashi .......... G02B 27/2214
                                                  349/33
(Continued)

FOREIGN PATENT DOCUMENTS

CN         101762896 A      6/2010
JP         2009-520231      5/2009
(Continued)

OTHER PUBLICATIONS

Notice of Rejection issued by the State Intellectual Property Office of the People's Republic of China on Nov. 27, 2015, for Chinese Patent Application No. 201180075376.3, and English-language translation thereof.
(Continued)

*Primary Examiner* — Thanh-Nhan P Nguyen
(74) *Attorney, Agent, or Firm* — Finnegan, Henderson, Farabow, Garrett & Dunner LLP

(57) ABSTRACT

According to an embodiment, a liquid crystal lens device includes an optical element and a voltage controller. The optical element includes: a refractive index modulation layer of which a refractive index distribution changes according to a voltage applied thereto; and electrodes to apply a voltage to the refractive index modulation layer. In a first voltage state, the voltage controller controls voltages applied to the electrodes such that a first refractive index distribution is arranged periodically in the optical element. In a second voltage state, the voltage controller controls voltages applied to the electrodes such that a second refractive index distribution is achieved. In an intermediate voltage state, the voltage controller controls a voltage applied to a first-type electrode, to which a first voltage that is the maximum value among the voltages applied to the electrodes in the first
(Continued)

voltage state is applied, to a second voltage lower than the first voltage.

15 Claims, 23 Drawing Sheets

(51) Int. Cl.
  *H04N 13/04* (2006.01)
  *G09G 3/00* (2006.01)
  *G02F 1/29* (2006.01)
  *G09G 3/36* (2006.01)
  *G02F 1/1343* (2006.01)
(52) U.S. Cl.
  CPC ..... *H04N 13/0404* (2013.01); *H04N 13/0452* (2013.01); *G02F 2001/134381* (2013.01); *G02F 2001/294* (2013.01); *G09G 3/36* (2013.01)

(56) References Cited

U.S. PATENT DOCUMENTS

2010/0238276 A1  9/2010  Takagi et al.
2013/0222742 A1  8/2013  Kashiwagi et al.

FOREIGN PATENT DOCUMENTS

JP      2010-170068      8/2010
JP      2010-224191     10/2010
TW       201030378 A1    8/2010
WO   WO 2007/072289 A2   6/2007

OTHER PUBLICATIONS

Office Action issued by the Taiwanese Patent Office on Jan. 8, 2015, for Taiwanese Patent Application No. 101104056, and English-language translation thereof.
Notice of Rejection issued by the Japanese Patent Office on Jan. 27, 2015, for Japanese Patent Application No. 2013-548007, and English-language translation thereof.
International Search Report issued by the Japanese Patent Office on Feb. 14, 2012, for International Patent Application No. PCT/JP2011/078309.
Chen et al., "3.5: Dual Directional Overdriving Method for Fast Response LC-lenses on Autostereoscopic 3D Display," SID 11 Digest (2011), pp. 17-20.
Notice of Rejection issued by the Japanese Patent Office on May 12, 2015, for Japanese Patent Application No. 2013-548007, and English-language translation thereof.

* cited by examiner

FIG. 26
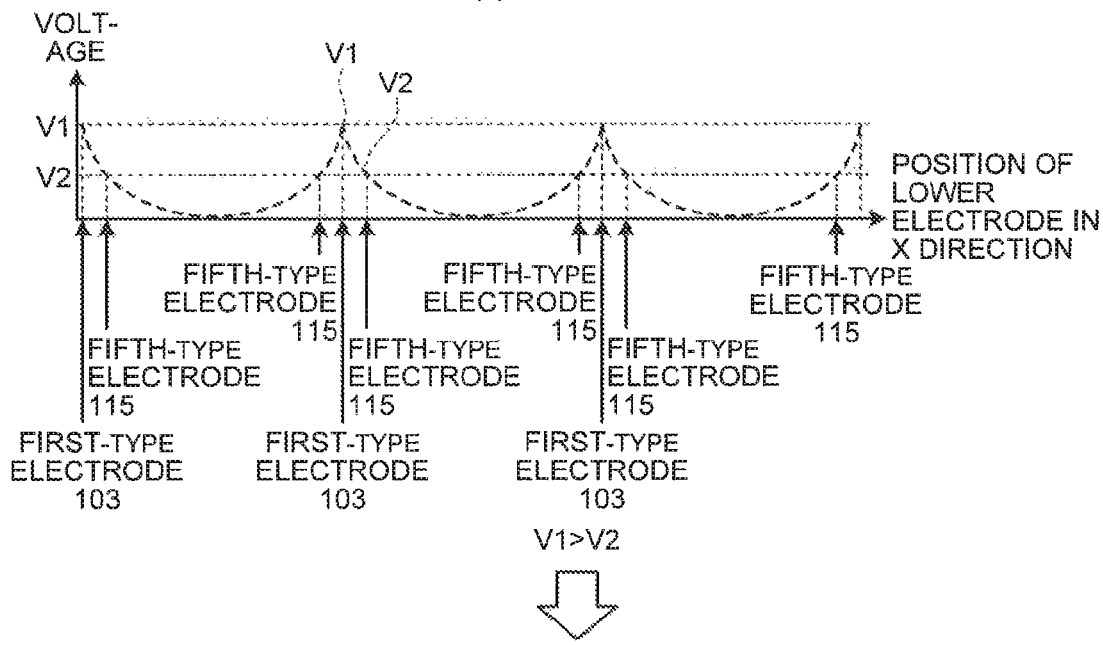
(a) FIRST MODE
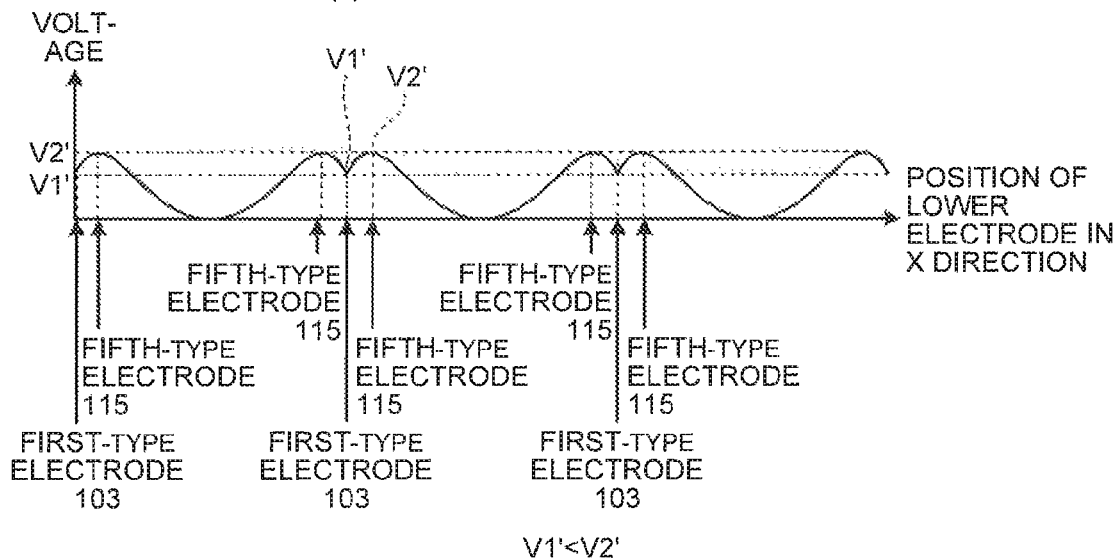
(b) INTERMEDIATE VOLTAGE STATE

FIG.27
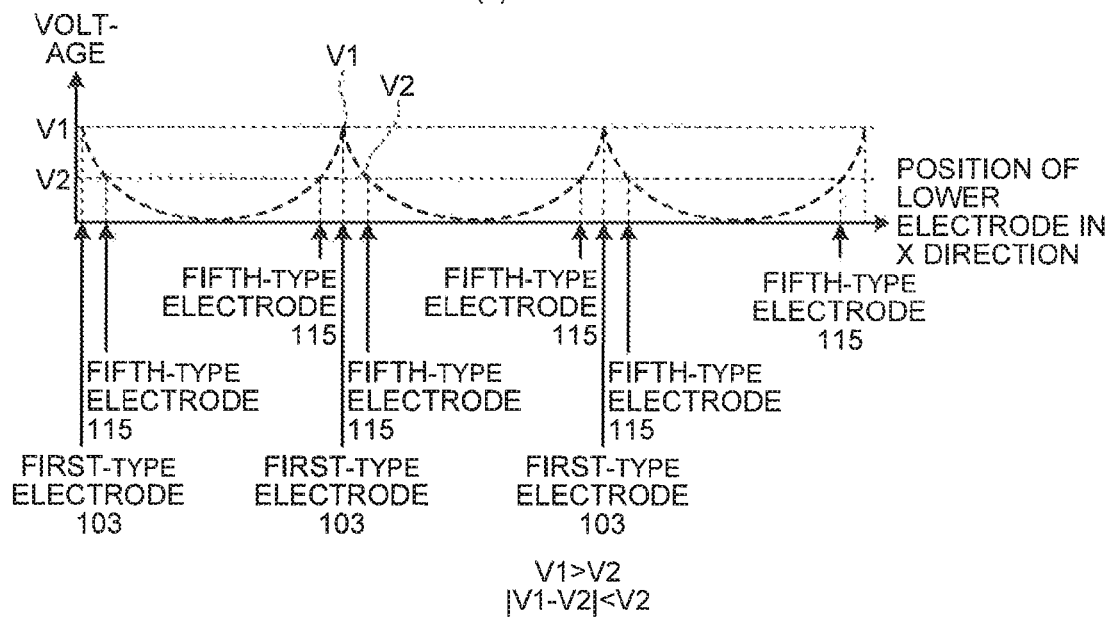
(a) FIRST MODE
V1 > V2
|V1−V2| < V2
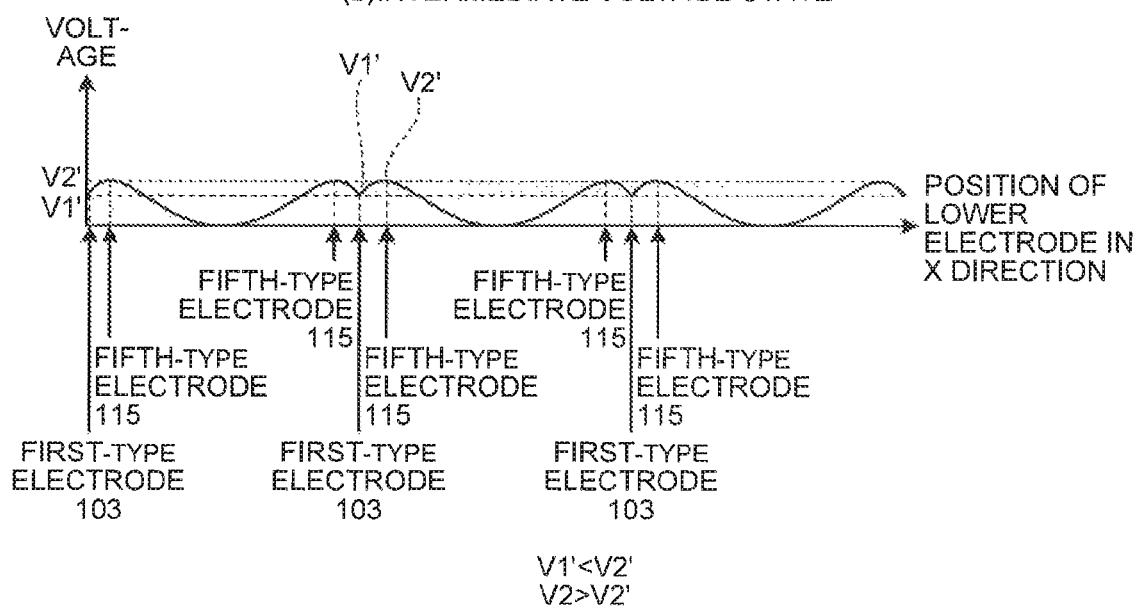
(b) INTERMEDIATE VOLTAGE STATE
V1' < V2'
V2 > V2'

FIG.28
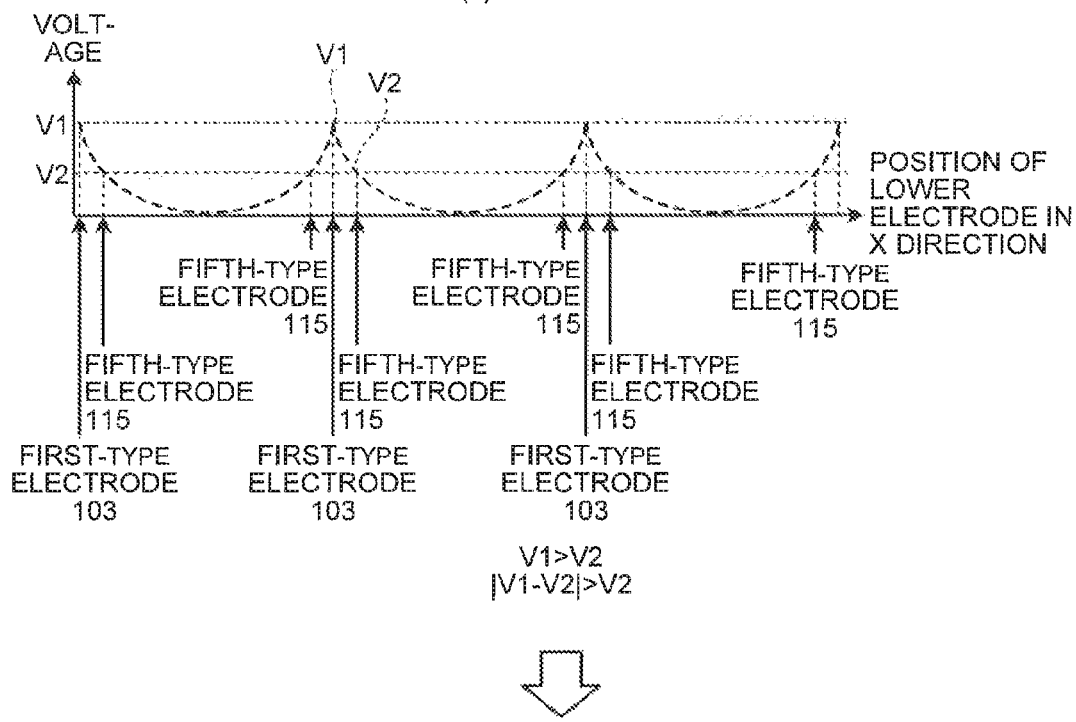
(a) FIRST MODE
V1 > V2
|V1−V2| > V2
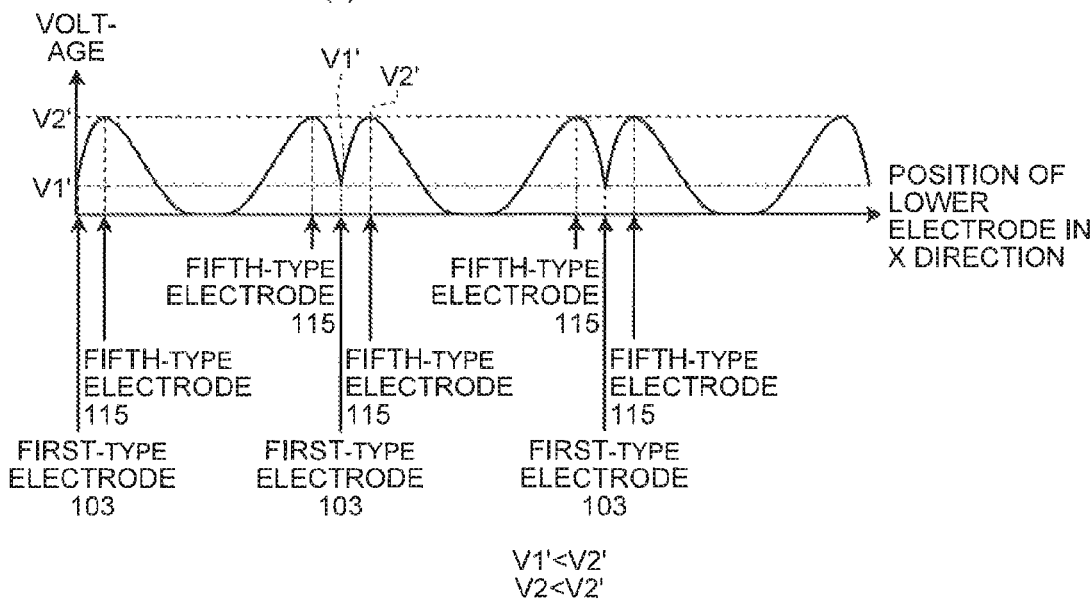
(b) INTERMEDIATE VOLTAGE STATE
V1' < V2'
V2 < V2'

FIG.29
(a) FIRST MODE
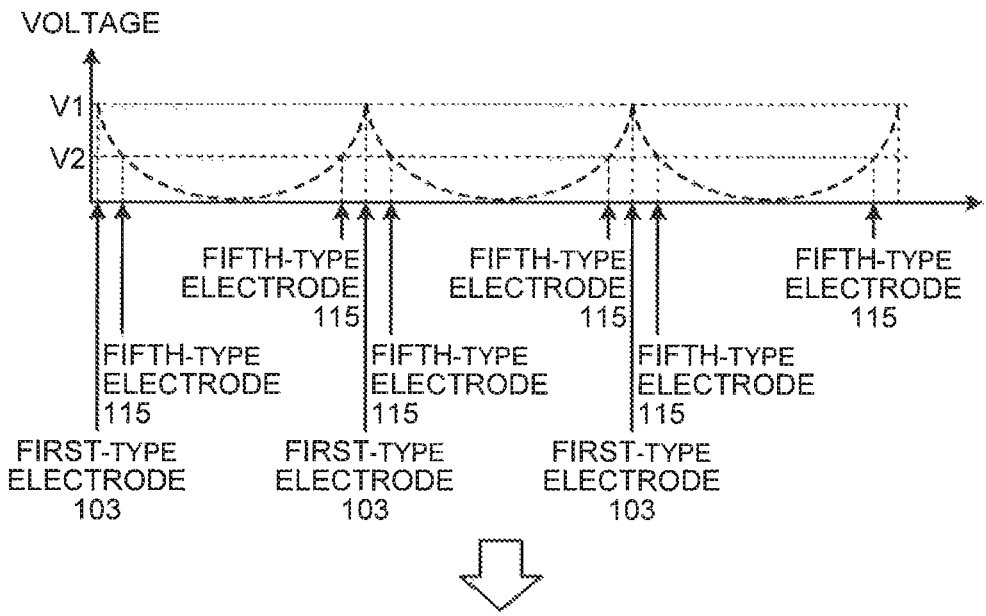
(b) INTERMEDIATE VOLTAGE STATE
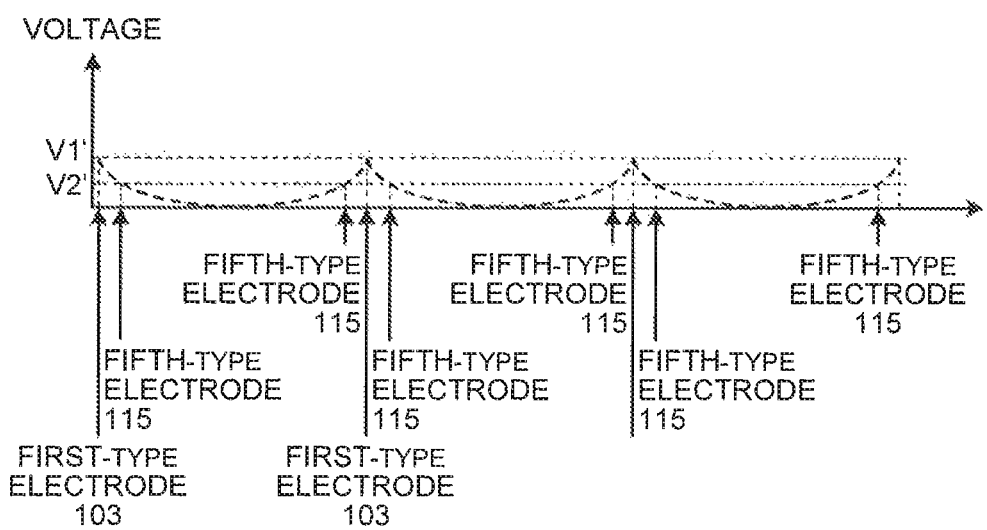
$|V1-V1'| \geq |V2-V2'|$ FIG.30
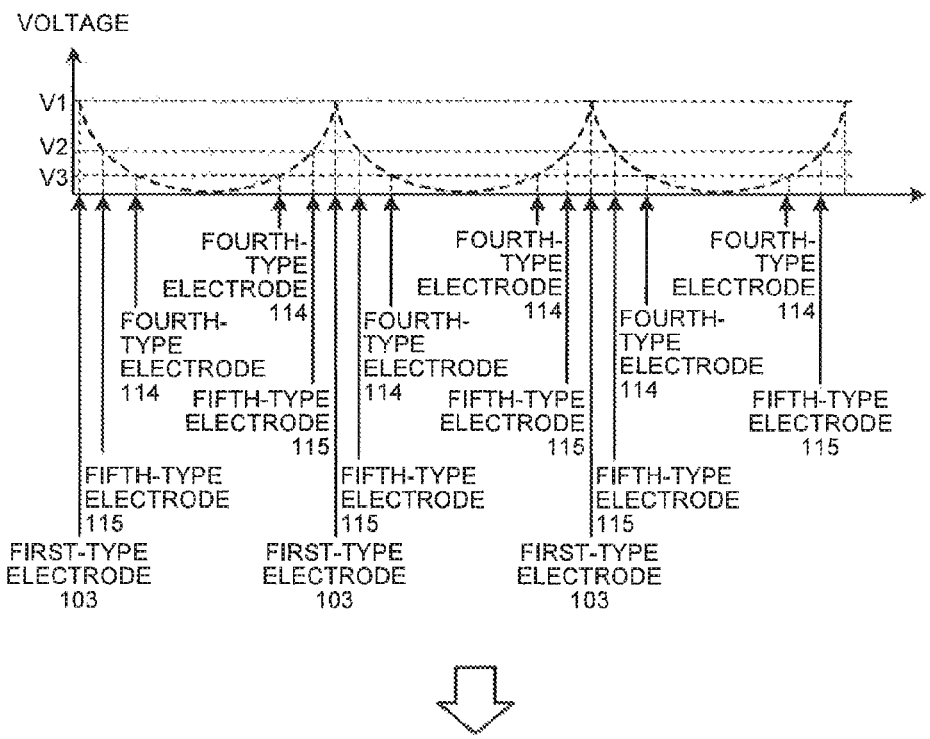
(a) FIRST MODE
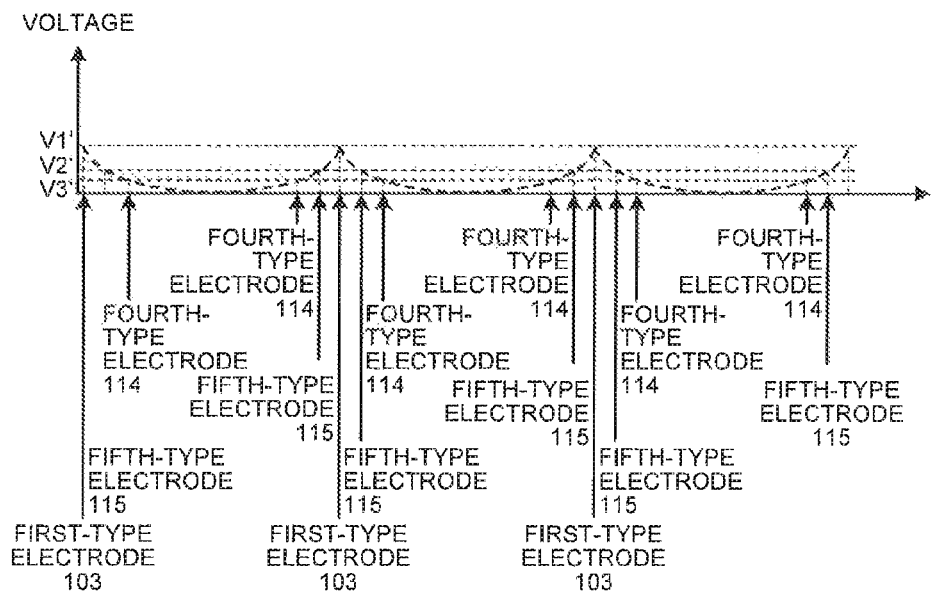
(b) INTERMEDIATE VOLTAGE STATE
$$\frac{|V1-V1'|}{|V2-V2'|} \geq \frac{|V2-V2'|}{|V3-V3'|}$$

FIG.31
(a) FIRST MODE
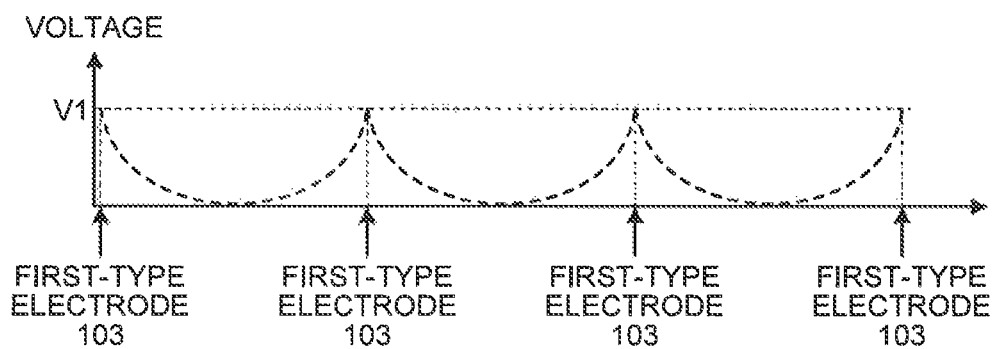
⇩
(b) INTERMEDIATE VOLTAGE STATE
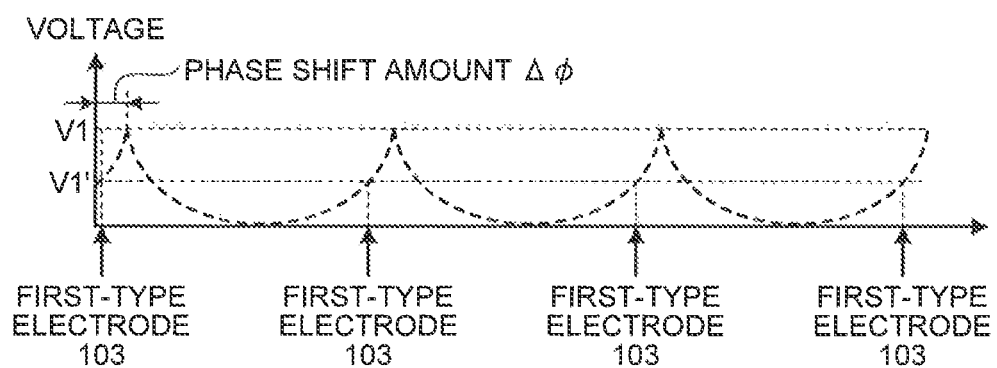

FIG.32
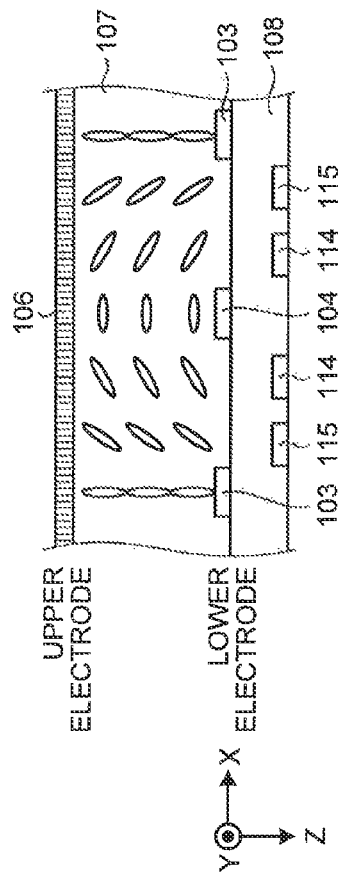
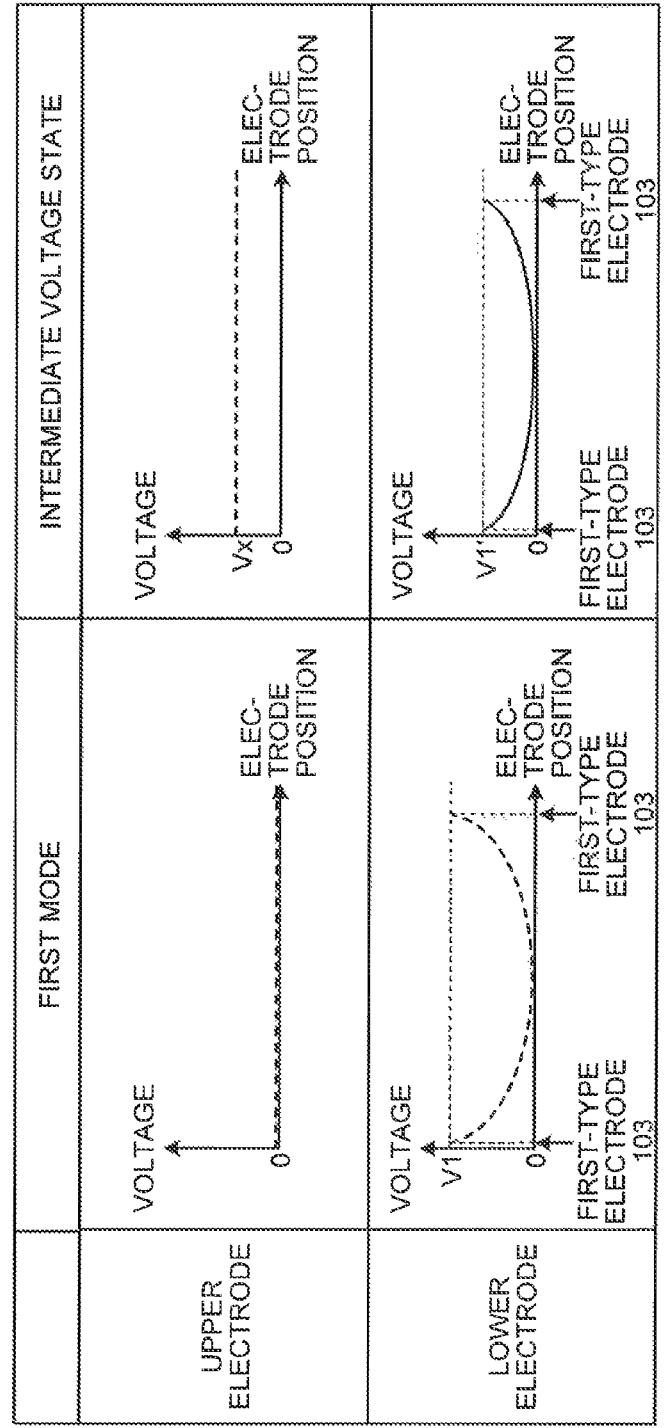

LIQUID CRYSTAL LENS DEVICE, IMAGE DISPLAY APPARATUS, DRIVE DEVICE, AND DRIVE METHOD

CROSS-REFERENCE TO RELATED APPLICATIONS

This application is a continuation of PCT international application Ser. No. PCT/JP2011/078309 filed on Dec. 7, 2011 which designates the United States; the entire contents of which are incorporated herein by reference.

FIELD

Embodiments described herein relate generally to a liquid crystal lens device, an image display apparatus, a drive device, and a drive method.

BACKGROUND

There are known stereoscopic image display apparatuses allowing viewers to view stereoscopic images with the naked eyes without wearing special glasses. Such a stereoscopic image display apparatus displays a plurality of images from different viewpoints, and controls light beams for the images with an optical element. The controlled light beams are guided to both eyes of a viewer, who can then recognize a stereoscopic image if the viewer is at a proper viewing position. There is known an optical element using, as the optical element, a parallax barrier or a lenticular lens.

However, in the apparatus using the parallax barrier or the lenticular lens as the optical element, the resolution of the stereoscopic image or the display quality of a planar (2D) image may be degraded. In order to keep the display quality of the planar image, there is known a technique using a liquid crystal optical element or a birefringent element as an optical element capable of switching a display between a 2D display and a 3D display. However, a switching speed of switching from the 3D display to the 2D display often becomes an issue. As a technique to increase the switching speed, there is known a technique of establishing an intermediate voltage state when switching the display from the 3D display to the 2D display in a multielectrode structure in which electrodes formed on an upper substrate and electrodes formed on a lower substrate are arranged to face each other. In switching the display from the 3D display to the 2D display in this technique, a voltage state is set from a first voltage state to the intermediate voltage state. In the first voltage state, a voltage applied to each electrode is controlled in such a way that a refractive index distribution is achieved which acts as a lens array in which a lens is periodically arranged. In the intermediate voltage state, a voltage V1 applied to electrodes corresponding to the ends of the lens formed in the first voltage state and 0 V voltage are alternately applied to each electrode. Thereafter, a voltage state is set to a second voltage state in which a voltage applied to each electrode is controlled in such a way that a refractive index distribution with a fixed refractive index is achieved.

In the aforementioned related art, however, the voltage applied to first-type electrodes corresponding to the ends of the lens is the maximum among voltages applied to the electrodes in the first voltage state, thereby likely causing misorientation at the ends of the lens. Moreover, the voltage applied to the first-type electrodes in the intermediate voltage state is set to the same value (V1) as the voltage applied to the first-type electrodes in the first voltage state, whereby it has been difficult to sufficiently increase the switching speed when switching from the refractive index distribution corresponding to the first voltage state to the refractive index distribution corresponding to the second voltage state.

BRIEF DESCRIPTION OF THE DRAWINGS

FIG. 26 is a diagram for explaining voltage patterns according to a modification;

FIG. 27 is a diagram for explaining voltage patterns according to a modification;

FIG. 28 is a diagram for explaining voltage patterns according to a modification;

FIG. 29 is a diagram for explaining voltage patterns according to a modification;

FIG. 30 is a diagram for explaining voltage patterns according to a modification;

FIG. 31 is a diagram for explaining voltage patterns according to third embodiment; and FIG. 32 is a diagram illustrating mode switching according to fourth embodiment.

DETAILED DESCRIPTION

Figure 1:
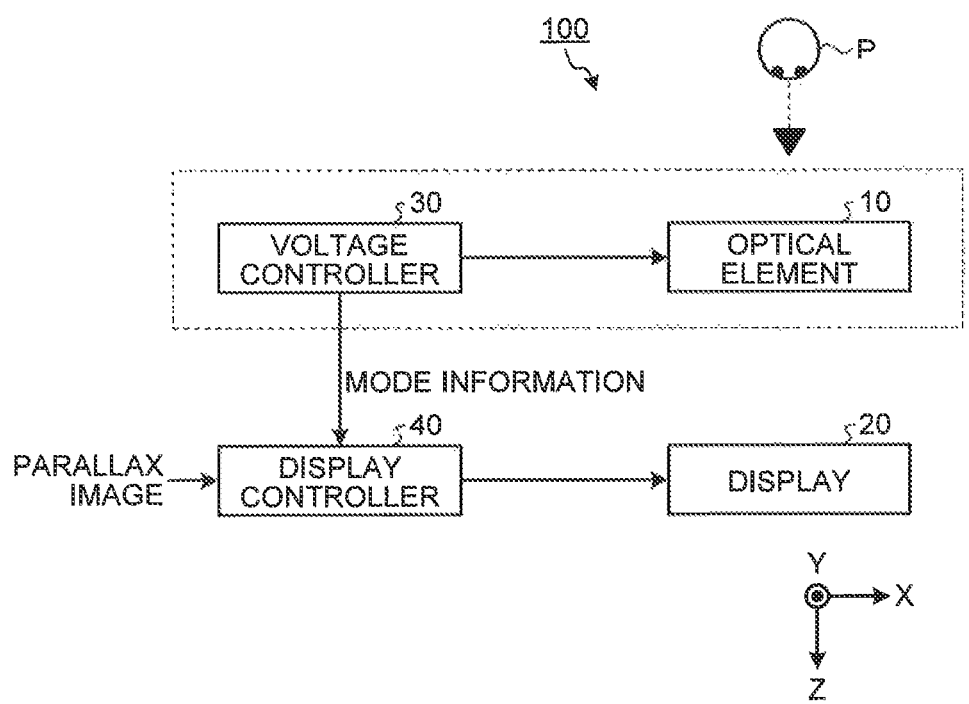
FIG. 1 is a diagram illustrating an example of the configuration of an image display apparatus according to first embodiment.

According to an embodiment, a liquid crystal lens device includes an optical element and a voltage controller. The optical element includes: a refractive index modulation layer of which a refractive index distribution changes according to a voltage applied thereto; and a plurality of electrodes to apply a voltage to the refractive index modulation layer. When a state of voltage applied to the electrodes is in a first voltage state, the voltage controller controls voltages applied to the electrodes in such a way that a first refractive index distribution is arranged periodically in at least a part of the optical element. The first refractive index distribution has a gradient refractive index of the refractive index modulation layer. When the state of voltage is in a second voltage state different from the first voltage state, the voltage controller controls voltages applied to the electrodes in such a way that a second refractive index distribution is achieved. When the state of voltage is in an intermediate voltage state that is set when the voltage state is switched from the first voltage state to the second voltage state, the voltage controller controls a voltage applied to a first-type electrode, to which a first voltage that is the maximum value among the voltages applied to the electrodes in the first voltage state is applied, to a second voltage lower than the first voltage. Moreover, an image display apparatus of the embodiment includes the liquid crystal lens device and a display. The display is provided on the back of the optical element to display an image.

Various embodiments will be described in detail with reference to the drawings. Note that a component assigned with the same reference numeral in each embodiment below is considered to have a similar function, whereby redundant description will be omitted as appropriate.

First Embodiment

FIG. 1 is a block diagram illustrating an example of the configuration of an image display apparatus 100 according to the present embodiment. The image display apparatus 100 is capable of displaying stereoscopic images (three-dimensional images). The image display apparatus 100 is also capable of displaying planar images (two-dimensional images), and is configured to be able to switch between displaying three-dimensional images and displaying two-dimensional images.

As illustrated in FIG. 1, the image display apparatus 100 includes an optical element 10, a display 20, a voltage controller 30, and a display controller 40. When a viewer P views the display 20 via the optical element 10, he or she becomes able to recognize a stereoscopic image or the like that is displayed on the display 20. Here, a part enclosed with a dotted line in FIG. 1 (the optical element 10 and the voltage controller 30) corresponds to the liquid crystal lens device of the present invention, and the voltage controller 30 corresponds to the drive device of the present invention.

A refractive index distribution of the optical element 10 changes according to the voltage applied thereto. The light beams coming out from the display 20 and falling on the optical element 10 exit in a direction depending on the refractive index distribution of the optical element 10. In the present embodiment, the explanation is given about an example in which the optical element 10 is a liquid crystal GRIN (gradient index) lens array. However, the optical element may be configured differently. The optical element 10 of the present embodiment includes at least a liquid crystal layer of which the refractive index distribution changes according to the voltage applied thereto, and a plurality of electrodes which can apply a voltage to the liquid crystal layer. The configuration of the optical element 10 of the present embodiment will be described in more detail later.

The display 20 is provided on the back side of the optical element 10 to display images. The display 20 displays parallax images that are used in displaying a stereoscopic image, for example. The display 20 may have a known configuration in which, for example, sub-pixels of RGB colors are arranged into a matrix-like manner with RGB constituting a single pixel. A parallax image from the display controller 40 is assigned to each pixel in the display 20 under control of the display controller 40. The light from each pixel exits in a direction depending on the refractive index distribution of the liquid crystal GRIN lens formed in accordance with the pixel. Meanwhile, any other known arrangement of sub-pixels may be adopted in the display 20. Moreover, the sub-pixels are not limited to the three colors of RGB but may also have four colors, for example.

The voltage controller 30 controls the voltage to be applied to an electrode included in the optical element 10. In the present embodiment, the voltage controller 30 accepts an input specifying a mode that indicates a state of voltage applied to the electrode included in the optical element 10, and sets the mode indicated by the accepted input. From another point of view, the mode can be regarded as the indication of a display type of an image or a type of the refractive index distribution in the optical element 10. The voltage controller 30 controls, in a variable manner, the voltage applied to the electrode included in the optical element 10 so as to perform setting of the mode indicated by the accepted input. The voltage controller 30 further transmits to the display controller 40 mode information, which specifies the mode indicated by the accepted input. Herein, examples of the mode include a first mode and a second mode. As described below, an extending direction of a lens (the liquid crystal GRIN lens) formed in the first mode and an extending direction of a lens formed in the second mode are orthogonal to each other, so that the displaying can be switched between vertical/horizontal orientations by switching between the first mode and the second mode. Note that the type of the mode and the number of modes are not limited to what is described herein but may be set at will. Moreover, the mode may be set by an arbitrary method in which, for example, the mode is automatically switched according to the number of persons viewing a three-dimensional image. While the mode is controlled for the entire surface of the optical element 10 at once in each embodiment, the voltage may instead be controlled such that each region of the optical element 10 is in a different mode. The first mode may be configured to form a lens in a specific region of the optical element 10 and not form a lens in the rest of the regions, for example.

The display controller 40 controls the display 20 to display an image (such as a parallax image). In the present embodiment, the display controller 40 refers to the mode information passed from the voltage controller 30, acquires an image (such as a parallax image) to be displayed in the mode specified in the mode information, and controls the display 20 to display the acquired image.

Figure 2:
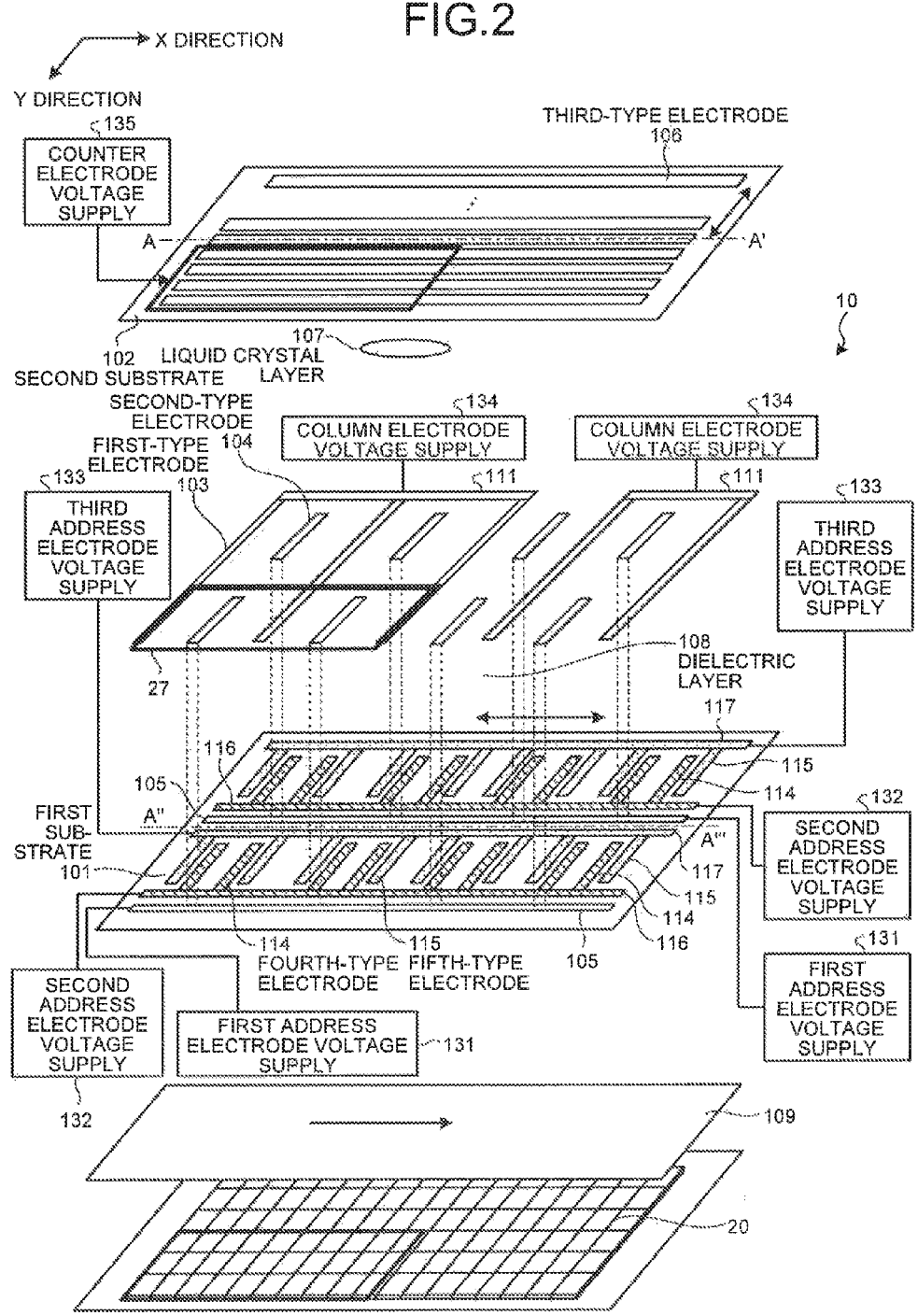
FIG. 2 is an exploded perspective view of the image display apparatus according to the first embodiment.

FIG. 2 is an exploded perspective view illustrating a specific example of the configuration of the image display apparatus 100. The voltage controller 30 and the display controller 40 are omitted from the example illustrated in FIG. 2. Note that in the example illustrated in FIG. 2, a part corresponding to a double-headed arrow indicates a pitch of each lens (a lens pitch) constituting the lens array that is formed in the first mode or the second mode. A part enclosed with a bold line in the example illustrated in FIG. 2 represents a single unit of a partial 3D display region.

As illustrated in FIG. 2, the optical element 10 includes a first substrate 101, a second substrate 102 facing the first substrate 101, and a liquid crystal layer 107 sandwiched between the first substrate 101 and the second substrate 102. Each of the first substrate 101 and the second substrate 102 is formed of a transparent material and has a flat form. That is, the first substrate 101 and the second substrate 102 can transmit light.

A surface of the first substrate 101 on the side of the liquid crystal layer 107 is covered with a dielectric layer 108, and a plurality of first-type electrodes 103 extending along a Y direction in FIG. 2 as well as a plurality of second-type electrodes 104 extending along the Y direction are formed on a top surface of the dielectric layer 108. FIG. 2 illustrates an example in which the first-type electrodes 103 and the second-type electrodes 104 are arranged alternately along an X direction orthogonal to the Y direction. In the example illustrated in FIG. 2, a plurality of fourth-type electrodes 114 extending along the Y direction as well as a plurality of fifth-type electrodes 115 extending along the Y direction are also formed on the surface of the first substrate 101 on the side of the liquid crystal layer 107. When viewed from a direction normal to the first substrate 101, a single fourth-type electrode 114 and a single fifth-type electrode 115 are arranged between the first-type electrode 103 and the second-type electrode 104 that are adjacent to each other. Specific description will be given as follows.

Formed on the surface of the first substrate 101 on the side of the liquid crystal layer 107 is a plurality of second-type electrode lead wires 105 extending along the X direction in FIG. 2. Each second-type electrode lead wire 105 is arranged at a predetermined interval in the Y direction indicated in FIG. 2. The second-type electrode lead wire 105 is covered with the dielectric layer 108, and the plurality of second-type electrodes 104 extending with a predetermined length in the Y direction is formed on the top surface of the dielectric layer 108. FIG. 2 illustrates the example in which the plurality of second-type electrodes 104 is divided into a second number of groups, each of which includes the plurality of second-type electrodes 104 arranged along the X direction. One group of the second-type electrodes 104 corresponds to one of the second-type electrode lead wires 105, and each second-type electrode lead wire 105 is connected, through a contact hole (indicated by a dotted line in FIG. 2) passing through the dielectric layer 108, to a terminal of each of the plurality of second-type electrodes 104 that belongs to the group corresponding to that second-type electrode lead wire 105. In other words, the plurality of second-type electrodes 104 connected to the single second-type electrode lead wire 105 belongs to the same group. This means that the plurality of second-type electrodes 104 belonging to the same group is electrically connected to one another. Conversely, the second-type electrodes 104 belonging to a different group are not electrically connected to one another.

Formed on the top surface of the dielectric layer 108 is the plurality of first-type electrodes 103 extending in the Y direction, and each first-type electrode 103 is arranged at a predetermined interval in the X direction. FIG. 2 illustrates the example in which the plurality of first-type electrodes 103 is divided into a first number of groups, each of which includes the plurality of first-type electrodes 103 arranged along the X direction. Formed on the top surface of the dielectric layer 108 in the example illustrated in FIG. 2 is a first-type electrode lead wire 111 extending with a predetermined length in the X direction for each group of the first-type electrodes 103. A terminal of each of the plurality of first-type electrodes 103 belonging to each group is connected to the first-type electrode lead wire 111 corresponding to the group. As a result, the plurality of first-type electrodes 103 belonging to the same group is electrically connected to one another. Conversely, the first-type electrodes 103 belonging to a different group are not electrically connected to one another. The first-type electrode 103 and the second-type electrode 104 are insulated from each other by the dielectric layer 108.

In the example illustrated in FIG. 2, there are formed on the surface of the first substrate 101 on the side of the liquid crystal layer 107 a plurality of fourth-type electrode lead wires 116 extending along the X direction and a plurality of fifth-type electrode lead wires 117 extending along the X direction. FIG. 2 illustrates the example in which a single fourth-type electrode lead wire 116 and a single fifth-type electrode lead wire 117 are arranged between the second-type electrode lead wires 105 that are adjacent to each other in the Y direction, and the fourth-type electrode lead wire 116 and the fifth-type electrode lead wire 117 are arranged at a predetermined interval from each other in the Y direction.

The plurality of fourth-type electrodes 114 extending along the Y direction is connected to each fourth-type electrode lead wire 116. Moreover, the plurality of fifth-type electrodes 115 extending along the Y direction is connected to each fifth-type electrode lead wire 117. The fourth-type electrodes 114, the fifth-type electrodes 115, the fourth-type electrode lead wires 116, and the fifth-type electrode lead wires 117 that are formed on the surface of the first substrate 101 on the side of the liquid crystal layer 107 are covered with the dielectric layer 108.

As described above, when viewed from the direction normal to the first substrate 101, a single fourth-type electrode 114 and a single fifth-type electrode 125 in the example illustrated in FIG. 2 are arranged between the first-type electrode 103 and the second-type electrode 104. The number of electrodes arranged between the first-type electrode 103 and the second-type electrode 104 is not limited to two electrodes but may be one electrode or three or more electrodes, for example. Note that the first-type electrode 103, the second-type electrode 104, the fourth-type electrode 114, and the fifth-type electrode 115 are hereinafter sometimes referred to as a "lower electrode" when each electrode need not be distinguished.

The liquid crystal layer 107 sandwiched between the first substrate 101 and the second substrate 102 includes liquid crystal molecules and a dispersion medium used to disperse the liquid crystal molecules. In the present embodiment, a substance exhibiting uniaxial birefringence is used as an example of the liquid crystal molecule.

A plurality of third-type electrodes 106 extending along the X direction is formed on a surface of the second substrate 102 on the side of the liquid crystal layer 107. Each third-type electrode 106 is arranged in parallel along the Y direction while extending from one end of the second substrate 102 to another end thereof, for example. In the present embodiment, the direction to which the electrode (the third-type electrode 106) formed on the second substrate 102 extends is orthogonal to the direction to which each of the electrodes (the first-type electrode 103, the second-type electrode 104, the fourth-type electrode 114, and the fifth-type electrode 115) formed on the first substrate 101 extends. FIG. 2 illustrates the example in which the number of third-type electrodes 106 corresponds to the second number that is the number of groups of the second-type electrode 104. Here, the number of third-type electrodes 106 corresponding to one group of the second-type electrodes 104 equals seven but is not limited thereto. In other words, a predetermined number of the third-type electrodes 106 corresponding to each group are provided for each group of the second-type electrodes 104. Note that the third-type electrode 106 is hereinafter sometimes referred to as an "upper electrode".

In the example illustrated in FIG. 2, one set of electrodes is constituted by: two first-type electrodes 103 adjacent to each other; one second-type electrode 104, two fourth-type electrodes 114, and two fifth-type electrodes 115 all of which are located between the two first-type electrodes 103; and the plurality of third-type electrodes 106 located above that second-type electrode 104. A region where the plurality of third-type electrodes 106 overlaps a region bounded by three first-type electrodes 103 corresponds to a unit region 27 in which a partial 3D image is displayed. FIG. 2 illustrates the example in which there are four unit regions (divided in half vertically and horizontally) in which the partial 3D image is displayed.

Moreover, the optical element 10 in the example illustrated in FIG. 2 includes a first address electrode voltage supply 131, a second address electrode voltage supply 132, a third address electrode voltage supply 133, a column electrode voltage supply 134, and a counter electrode voltage supply 235. Each of the first address electrode voltage supply 131, the second address electrode voltage supply 132, the third address electrode voltage supply 133, the column electrode voltage supply 134, and the counter electrode voltage supply 135 is individually controlled by the voltage controller 30.

The first address electrode voltage supply 131 is individually provided for each second-type electrode lead wire 105 (each group of the second-type electrodes 104, from another point of view). Each first address electrode voltage supply 131 is electrically connected to the second-type electrode lead wire 105 corresponding to the first address electrode voltage supply 131. The first address electrode voltage supply 131 supplies a predetermined voltage to the second-type electrode lead wire 105 connected thereto under control of the voltage controller 30, so that the voltage of each of the plurality of second-type electrodes 104 connected to the second-type electrode lead wire 105 is set to the same value.

The second address electrode voltage supply 132 is individually provided for each fourth-type electrode lead wire 116. Each second address electrode voltage supply 132 is electrically connected to the fourth-type electrode lead wire 116 corresponding to the second address electrode voltage supply 132. The second address electrode voltage supply 132 supplies a predetermined voltage to the fourth-type electrode lead wire 116 connected thereto under control of the voltage controller 30, so that the voltage of each of the plurality of fourth-type electrodes 114 connected to the fourth-type electrode lead wire 116 is set to the same value.

The third address electrode voltage supply 233 is individually provided for each fifth-type electrode lead wire 117. Each third address electrode voltage supply 133 is electrically connected to the fifth-type electrode lead wire 117 corresponding to the third address electrode voltage supply 133. The third address electrode voltage supply 133 supplies a predetermined voltage to the fifth-type electrode lead wire 117 connected thereto under control of the voltage controller 30, so that the voltage of each of the plurality of fifth-type electrodes 115 connected to the fifth-type electrode lead wire 117 is set to the same value.

The column electrode voltage supply 134 is individually provided for each first-type electrode lead wire 111 (each group of the first-type electrodes 103, from a different point of view). Each column electrode voltage supply 134 is electrically connected to the first-type electrode lead wire 111 corresponding to the column electrode voltage supply 134. The column electrode voltage supply 134 supplies a predetermined voltage to the first-type electrode lead wire 111 connected thereto under control of the voltage controller 30, so that the voltage of each of the plurality of first-type electrodes 103 connected to the first-type electrode lead wire 111 is set to the same value.

The counter electrode voltage supply 135 is individually provided for every seven third-type electrodes 106 used to form a single lens (the liquid crystal GRIN lens) of the lens array formed in the second mode. The control performed on voltage applied to the third-type electrode 106 will be described later. Now, in FIG. 3, the description will focus on the seven third-type electrodes 106 used to form a single lens. In an example illustrated in FIG. 3, each of the first third-type electrode 106 and the seventh third-type electrode 106 from the top is arranged to correspond to the edge of the lens, while the fourth third-type electrode 106 from the top is arranged to correspond to the center of the lens.

Figure 3:
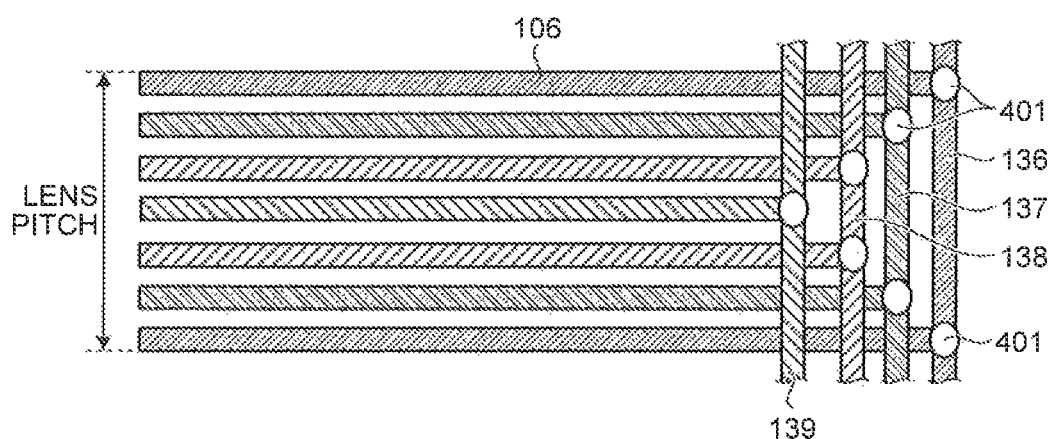
FIG. 3 is a diagram illustrating an example of the arrangement of a third-type electrode according to the first embodiment.

FIG. 3 illustrates the example where each of the first third-type electrode 106 and the seventh third-type electrode 106 from the top is connected to a first third-type electrode lead wire 136 through a through hole 401. Each of the second third-type electrode 106 and the sixth third-type electrode 106 from the top is connected to a second third-type electrode lead wire 137 through the through hole 401. Each of the third third-type electrode 106 and the fifth third-type electrode 106 from the top is connected to a third third-type electrode lead wire 138 through the through hole 401. The fourth third-type electrode 106 from the top is connected to a fourth third-type electrode lead wire 139 through the through hole 401. The voltage supplied to each of the first third-type electrode lead wire 136, the second third-type electrode lead wire 137, the third third-type electrode lead wire 138, and the fourth third-type electrode lead wire 139 is individually controlled by the voltage controller 30.

Referring back to FIG. 2, a polarizing plate 109 is provided on the underside of the first substrate 101 (on the side of the first substrate 101 not facing the liquid crystal layer 107), and the display 20 is provided on the underside of the polarizing plate 109 (on the side of the polarizing plate 109 not facing the first substrate 101). Note that an arrow illustrated on the polarizing plate 109 in FIG. 2 indicates a polarization direction. The display 20 may also be configured to include the polarizing plate 109. Note that, in the example illustrated in FIG. 2, the first number is set to two as the number of groups of the first-type electrode 103, and the second number is set to two as the number of groups of the second-type electrode 104. However, it is merely an example. Those numbers can be modified as appropriate depending on the size of a display screen or the size of a region assigned for a partial display.

Figure 4:
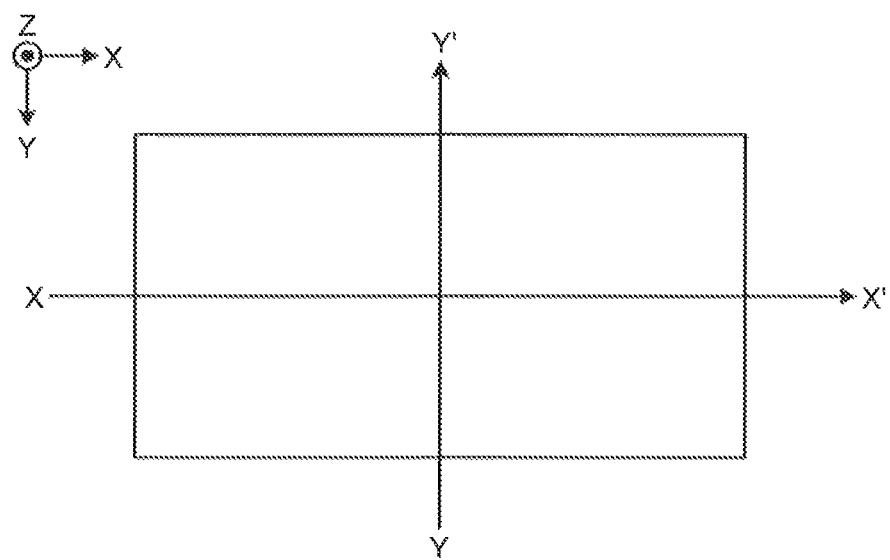
FIG. 4 is a plan view of an optical element according to the first embodiment when viewed from directly above.

FIG. 4 is a plan view of the optical element 10 as seen from directly above. When setting to the first mode, the voltage controller 30 controls the voltage applied to the upper electrode (the third-type electrode 106) to a common reference voltage (0 V in this example) and controls the voltage applied to each lower electrode (the first-type electrode 103, the second-type electrode 104, the fourth-type electrode 114, and the fifth-type electrode 115) individually in such a way that the refractive index distribution acting as a lens, whose ridgeline direction extends in a Y-Y' direction in FIG. 4, is periodically arranged along an X-X' direction in FIG. 4. That is, it can be understood that the lower electrode functions as a power supply side, and the upper electrode functions as a ground side in the first mode. When setting to the second mode, the voltage controller 30 controls the voltage applied to the lower electrode to the common reference voltage (0 V in this example) and controls the voltage applied to the upper electrode individually in such a way that the refractive index distribution acting as a lens, whose ridgeline direction extends in the X-X' direction in FIG. 4, is periodically arranged along the Y-Y' direction in FIG. 4. That is, it can be understood that the upper electrode functions as the power supply side, and the lower electrode functions as the ground side in the second mode.

Figure 5:
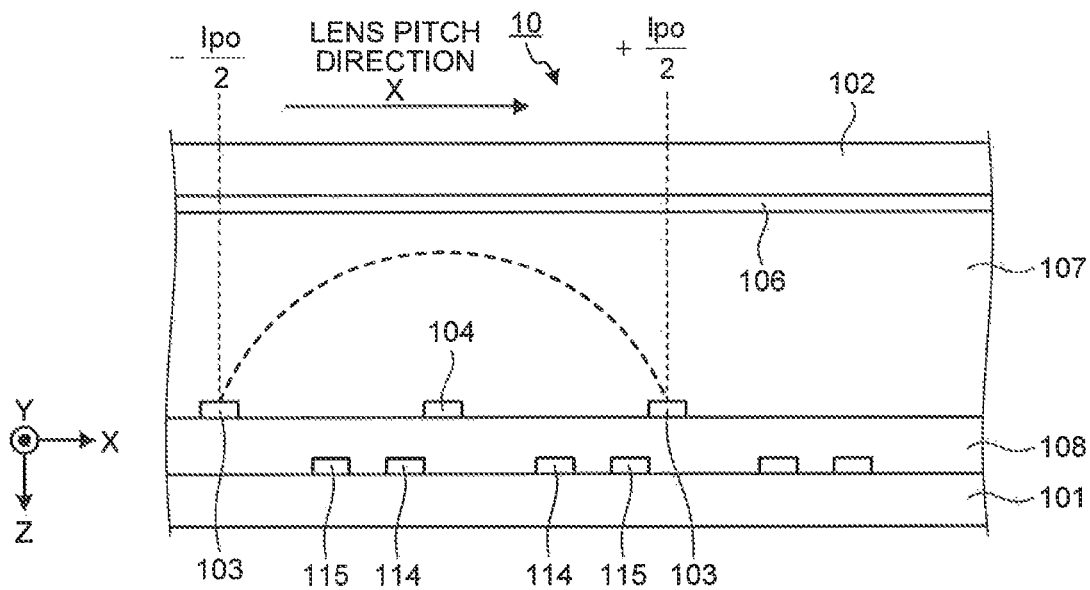
FIG. 5 is a cross-sectional view of the optical element according to the first embodiment.

Now, there will be described a refractive index distribution favorable in condensing light with the liquid crystal GRIN lens in the first mode as an example. FIG. 5 is a diagram illustrating a part of a cross section of the optical element 10 taken along line X-X' of FIG. 4. In FIG. 5, a case is assumed in which "X" represents a coordinate in a lens pitch direction; "Ne" represents the refractive index in the long axis direction of the liquid crystal molecules; No (<Ne) represents the refractive index in the short axis direction of the liquid crystal molecules; (Ne–No) represents the birefringence of the refractive index of the liquid crystals; and one lens included in the first lens array is formed in the section starting from a coordinate –lpo/2 to a coordinate +lpo/2 (i.e., a lens having the lens pitch "lpo" is formed). A dotted line in FIG. 5 represents the refractive index distribution. In this case, a favorable refractive index distribution for the purpose of achieving light condensing at the lens can be expressed by Expression (1) given below.

$$n(Y) = Ne - 4\left[\frac{Ne - No}{lpo^2}\right]Y^2 \quad (1)$$

Moreover, a retardation distribution can be expressed by Expression (2) which is obtained by multiplying both sides of Expression (1) given above by a thickness t of the liquid crystals and by subtracting Noxt therefrom. The tilt distribution of the liquid crystals is not constant in the thickness direction. Hence, when comparing the performance of a liquid crystal GRIN lens, the actual state can be represented better with the retardation distribution instead of the refractive index distribution.

$$n(Y)t - Not = Net - 4\left[\frac{Ne - No}{lpo^2}\right]tY^2 - Not \quad (2)$$

-continued
$$Re = (Ne - No)t - 4\left[\frac{Ne - No}{lpo^2}\right]tY^2$$

Figure 6:
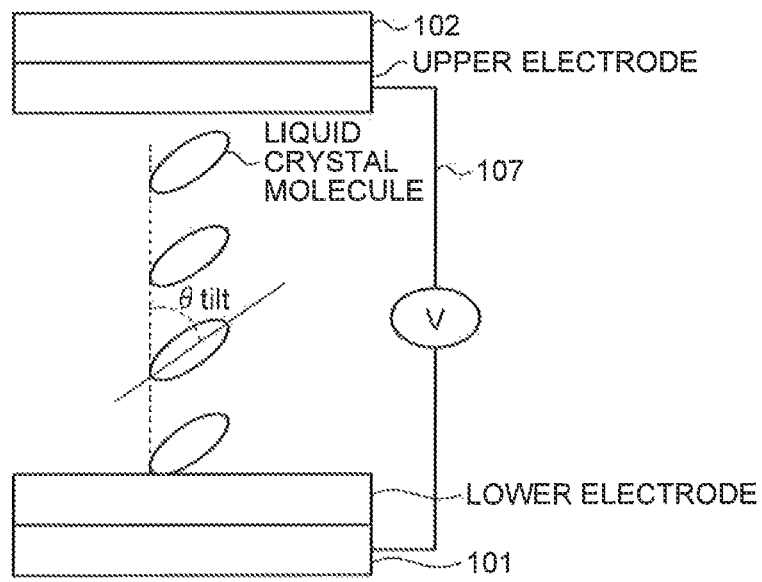
FIG. 6 is a diagram illustrating an angle at which a liquid crystal molecule stands up according to the first embodiment.

As illustrated in FIG. 6, θtilt represents the angle at which the liquid crystal molecules rise. In this example, the "θtilt" is expressed as the angle in the long axis direction of the liquid crystal molecules with respect to the normal line of the first substrate 101. If the liquid crystals are uniaxial in nature, the refractive index with respect to polarization whose direction coincides with the orientation of the liquid crystal molecules varies depending on the angles θtilt at which the liquid crystal molecules rise. The relationship between the tilt (θtilt) of liquid crystal directors (the average direction in the long axis of liquid crystal molecules) and the refractive index can be expressed by Expression (3) given below.

$$N(\theta tilt) = \frac{NeNo}{\sqrt{Ne^2\sin^2\theta tilt + No^2\cos^2\theta tilt}} \quad (3)$$

Figure 7:
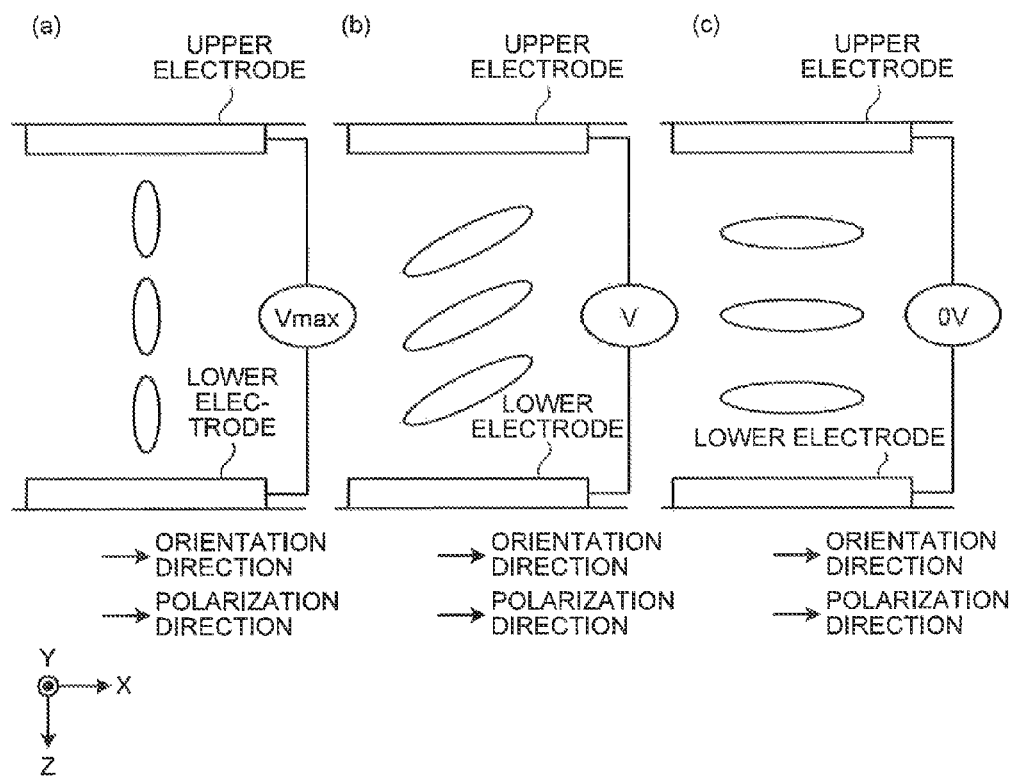
FIG. 7 is a diagram for explaining a method of controlling a tilt of a liquid crystal director according to the first embodiment.

Here, as illustrated in FIG. 7, it is assumed that the polarization direction coincides with the orientation direction of the liquid crystal directors. When a voltage is generated between the upper electrode and the lower electrode, the tilt of the liquid crystal directors changes according to that voltage. The more specific explanation is as follows.

In the example illustrated in FIG. 7, as illustrated in (a), if a voltage value Vmax that enables sufficient rising of the liquid crystal molecules is applied between the upper electrode and the lower electrode, θtilt=0° is satisfied. As a result, as can be understood from Expression (3) too, in this case, the refractive index N(0)=No (the refractive index in the short axis direction) is satisfied. Moreover, as illustrated in (c) of FIG. 5, if a voltage (≥0 V) that is below a threshold voltage Vth, which is required for the rising of the liquid crystal molecules, is applied between the upper electrode and the lower electrode, θtilt=90° is satisfied. As a result, as can be understood from Expression (3) too, in this case, the refractive index N(90)=Ne (the refractive index in the long axis direction) is satisfied. Furthermore, as illustrated in (b) of FIG. 5, if a voltage in the range from Vth to Vmax is applied between the upper electrode and the lower electrode, then θtilt is equal to an angle θ in the range from 0° to 90°, and a refractive index N(θ) is equal to a value in the range from No to Ne.

On the basis of the explanation given above, if the voltage applied to each electrode is controlled in such a way that: the electrodes placed at the positions corresponding to the ends of a liquid crystal GRIN lens are applied with the maximum voltage; and closer an electrode to the electrode placed at the position corresponding to the lens center, smaller is the voltage applied thereto, it becomes possible to achieve a refractive-index distribution that is close to the refractive-index distribution represented in Expression (1).

In the example illustrated in FIG. 5, one of the two adjacent first-type electrodes 103 is arranged at a position corresponding to one end of one lens (the liquid crystal GRIN lens) of the first lens array formed in the first mode, while another one of the two adjacent first-type electrodes 103 is arranged at a position corresponding to another end of the lens. Moreover, the second-type electrode 104 arranged between the two adjacent first-type electrodes 103 is arranged at a position corresponding to the center of the lens. When setting to the first mode, the voltage controller 30 controls a voltage applied to each electrode in such a way that: the voltage applied to the first-type electrode 103 exhibits the maximum value; and closer an electrode to the second-type electrode 104, lower is the voltage applied thereto; and the voltage applied to the second-type electrode 104 exhibits the minimum value. As a result, the refractive index distribution indicated by the dotted line in FIG. 5 can be obtained (the liquid crystal GRIN lens is formed).

Figure 8:
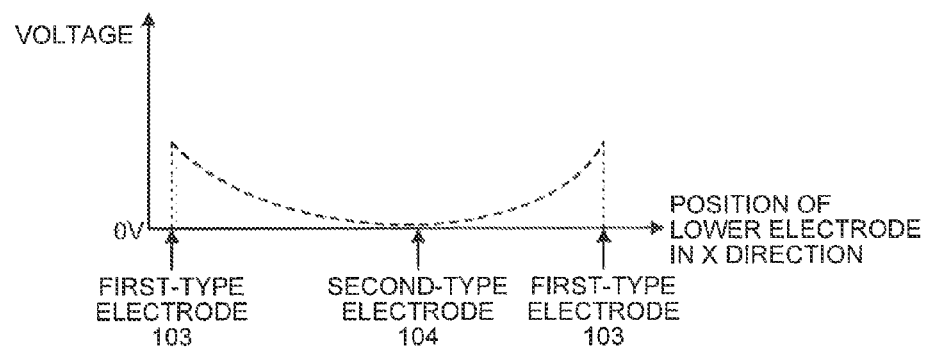
FIG. 8 is a diagram illustrating an example of a voltage pattern in a first mode according to the first embodiment.

FIG. 8 is a diagram illustrating the correspondence (can also be regarded as a voltage pattern) between the position (position in the X direction) of the lower electrode in the example illustrated in FIG. 5 and the voltage applied in the first mode. Here, the voltage applied to the upper electrode functioning as the ground side is controlled to 0 V, while the voltage applied to the first-type electrodes 103 corresponding to the ends of the lens is controlled to 6 V. The voltage applied to the second-type electrode 104 corresponding to the center of the lens is controlled to 0 V. Note that a distance between electrodes to which the maximum voltage is applied (distance between the adjacent first-type electrodes 103 in this case) can be perceived as the lens pitch of one lens of the first lens array formed in the first mode.

Figure 9:
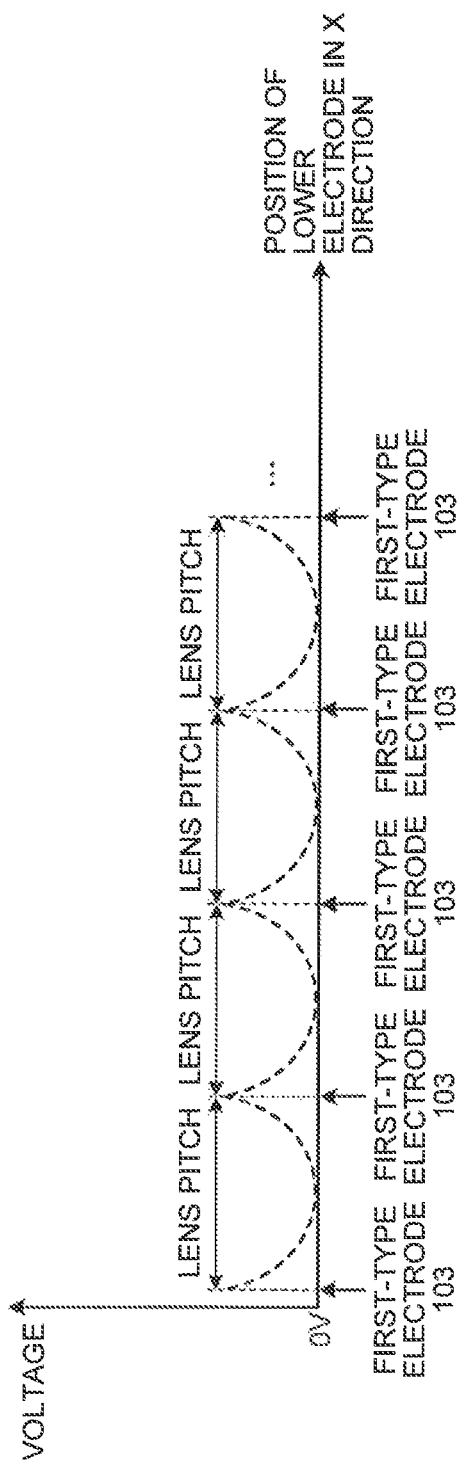
FIG. 9 is a diagram illustrating an example of the voltage pattern in the first mode according to the first embodiment.

When setting to the first mode, the voltage controller 30 controls the voltage applied to each electrode so as to form the first lens array in which the lens illustrated in FIG. 5 (lens with the ridgeline direction extending in the Y direction) is arranged periodically along the X direction, whereby the voltage pattern indicating the correspondence between the position of the lower electrode in the X direction and the voltage applied in the first mode is represented as illustrated in FIG. 9. It can be understood that, when setting to the first mode, the voltage controller 30 controls the voltage applied to each of the plurality of upper electrodes to have the same value (the reference voltage) while periodically changing the voltage applied to each of the plurality of lower electrodes.

Figure 10:
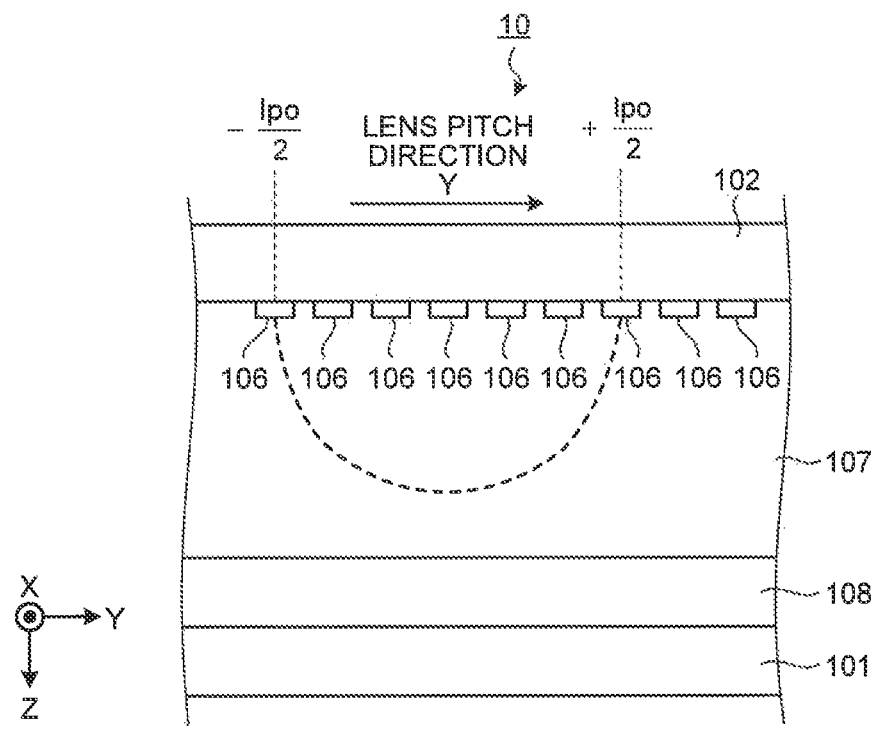
FIG. 10 is a cross-sectional view of the optical element according to the first embodiment.

When setting to the second mode, it is possible to think in the same manner as in the first mode. FIG. 10 is a diagram illustrating a part of the cross section of the optical element 10 taken along line Y-Y' of FIG. 4. In FIG. 10, a case is assumed in which "Y" represents a coordinate in the lens pitch direction of each lens configuring the second lens array that is formed in the second mode; and a lens of the second lens array is formed in the section starting from a coordinate −lpo/2 to a coordinate +lpo/2. A dotted line in FIG. 10 represents the refractive index distribution. Note that for the sake of convenience, the lower electrode is omitted from the example illustrated in FIG. 10. FIG. 10 illustrates the example in which the leftmost third-type electrode 106 is arranged at a position corresponding to one end of the lens while the seventh third-type electrode 106 from the left is arranged at a position corresponding to another end of the lens. In the example illustrated in FIG. 10, the fourth third-type electrode 106 from the left is arranged at a position corresponding to the center of the lens. When setting to the second mode, the voltage controller 30 controls a voltage applied to each electrode in such a way that: the voltage applied to the third-type electrode 106 (the leftmost third-type electrode 106 and the seventh third-type electrode in FIG. 10) arranged at positions corresponding to the ends of the lens exhibits the maximum value; closer an electrode to the third-type electrode 106 (the fourth third-type electrode 106 in FIG. 10) arranged at a position corresponding to the center of the lens lower is the voltage applied thereto; and the voltage applied to the third-type electrode 106 exhibits the minimum value. As a result, the refractive index distribution indicated by the dotted line in FIG. 10 can be obtained.

Figure 11:
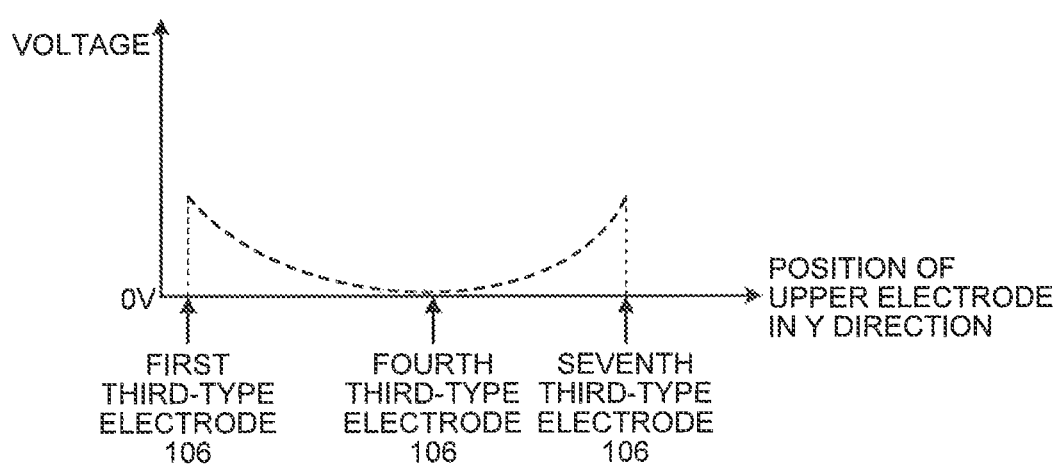
FIG. 11 is a diagram illustrating an example of a voltage pattern in a second mode according to the first embodiment.

FIG. 11 is a diagram illustrating the correspondence (the voltage pattern) between the position of the upper electrode (the position in the Y direction) in the example illustrated in FIG. 10 and the voltage applied in the second mode. Here, the voltage applied to the lower electrode functioning as the ground side is controlled to 0 V, while the voltage applied to the third-type electrodes 106 corresponding to the ends of the lens is controlled to 6 V. The voltage applied to the third-type electrode 106 corresponding to the center of the lens is controlled to 0 V. Note that a distance between electrodes to which the maximum voltage is applied (distance between the leftmost third-type electrode 106 and the seventh third-type electrode in the example illustrated in FIG. 10) can be perceived as the lens pitch of one lens of the second lens array formed in the second mode.

Figure 12:
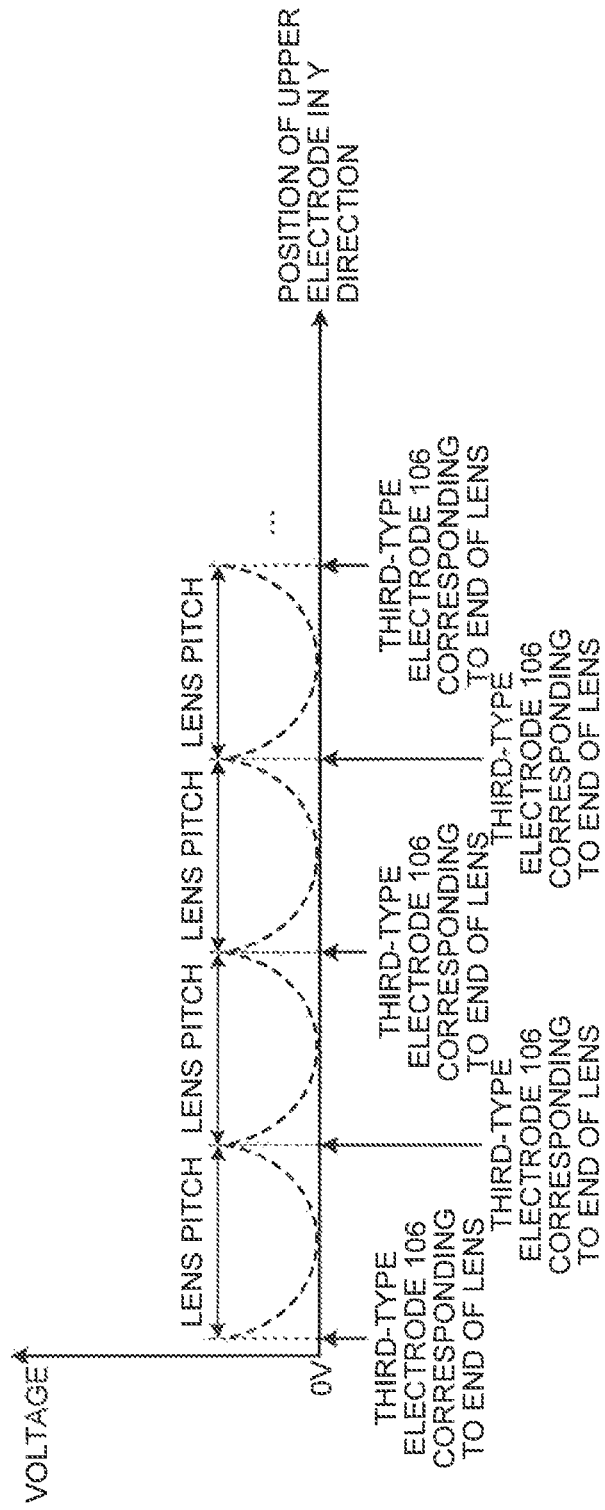
FIG. 12 is a diagram illustrating an example of the voltage pattern in the second mode according to the first embodiment.

When setting to the second mode, the voltage controller 30 controls the voltage applied to each electrode so as to form the second lens array in which the lens illustrated in FIG. 10 (lens with the ridgeline direction extending in the X direction) is arranged periodically along the Y direction, whereby the voltage pattern indicating the correspondence between the position of the upper electrode in the Y direction and the voltage applied in the second mode is represented as illustrated in FIG. 12. It can be understood that, when setting to the second mode, the voltage controller 30 controls the voltage applied to each of the plurality of lower electrodes to have the same value while periodically changing the voltage applied to each of the plurality of upper electrodes.

Figure 13:
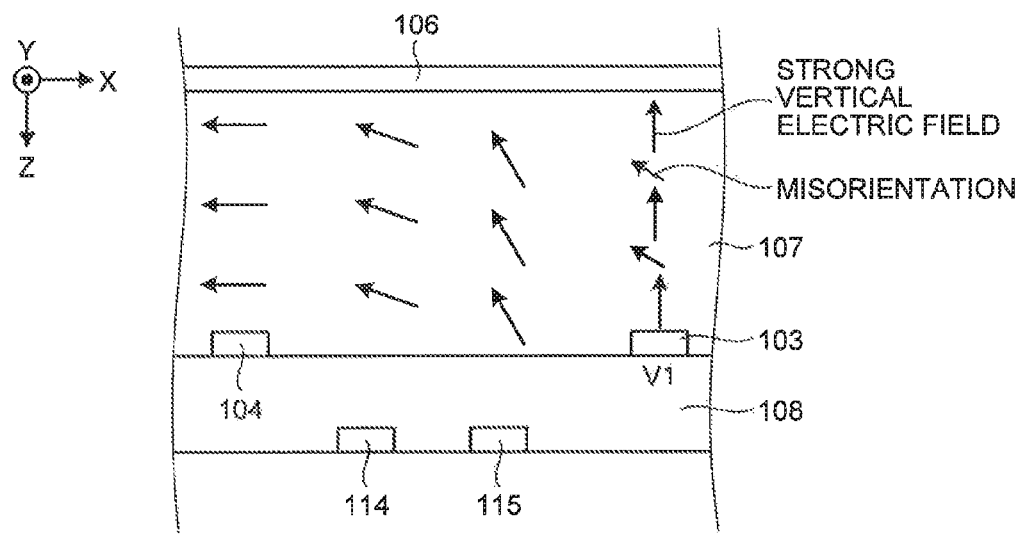
FIG. 13 is a cross-sectional view of the optical element according to the first embodiment.

In the present embodiment, the display can be switched between the vertical/horizontal orientations by switching between the first mode and the second mode. Here, it is assumed that the mode is switched from the first mode to the second mode. In the first mode, as described above, the first voltage V1 that is the maximum value among the voltages applied to the electrodes is applied to the first-type electrodes 103 arranged at positions corresponding to the ends of the liquid crystal GRIN lens formed in the first mode, whereby the vertical electric field (the electric field acting in a Z direction) stronger than that generated from other electrodes is generated from the first-type electrode 103 to which the first voltage V is applied, as illustrated in FIG. 13. As a result, the orientation of the liquid crystals (arrangement of the liquid crystal molecules) is more easily disturbed in the vicinity of (typically directly above) the first-type electrode 103 where the strong vertical electric field is acting. Once generated, the misorientation of the liquid crystals tends to remain even when the mode is switched to the second mode, whereby it takes longer for the refractive index distribution to be completely switched to the refractive index distribution corresponding to the second mode (the refractive index distribution that is to be obtained in the second mode). In other words, there arises a problem that the switching speed is decreased.

Figure 14:
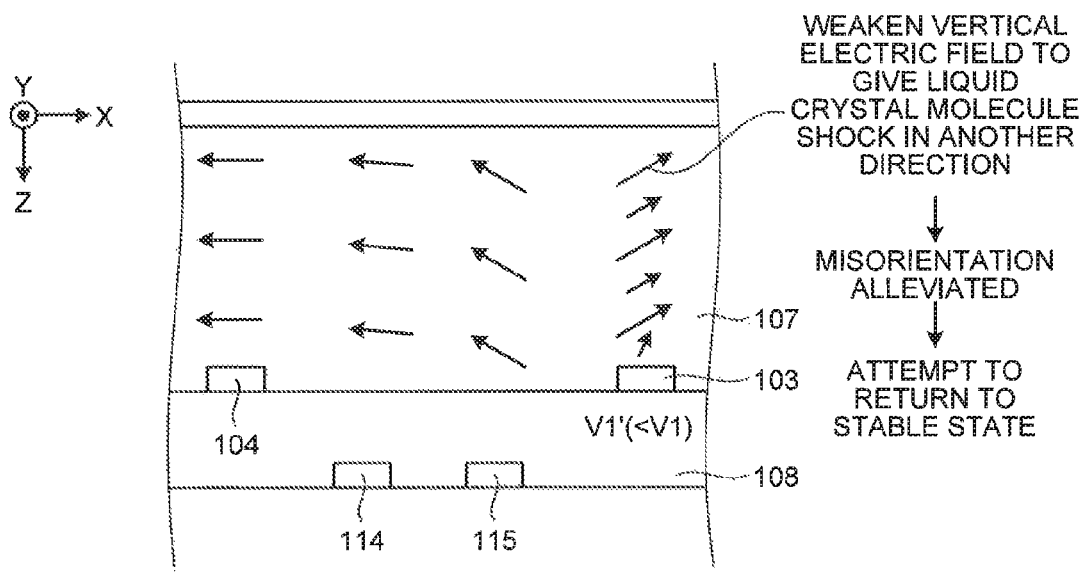
FIG. 14 is a cross-sectional view of the optical element according to the first embodiment.

Now, when the mode is switched from the first mode to the second mode in the present embodiment, the voltage controller 30 sets a state of voltage applied to the optical element 10 from the first mode to an intermediate voltage state and then to the second mode. When setting to the intermediate voltage state, the voltage controller 30 controls the voltage applied to the first-type electrode 103 to a second voltage V1' that is lower than the first voltage V1. As illustrated in FIG. 14, the vertical electric field generated from the first-type electrode 103 is weakened by decreasing the voltage applied to the first-type electrode 103, thereby giving an effect (shock) to the liquid crystals in the vicinity of the first-type electrode 103 to have an orientation different from that in the first mode. As a result, the electric field pattern in the first mode is altered so that the orientation of the liquid crystals in the vicinity of the first-type electrode 103 is more easily stabilized. This means that the misorientation of the liquid crystals in the vicinity of the first-type electrode 103 can be reset (resolved). Note that the value of the second voltage V1' can be arbitrarily set. In short, the second voltage V1' may be set to a value with which the misorientation of the liquid crystals generated in the first mode can be reset.

Figure 15:
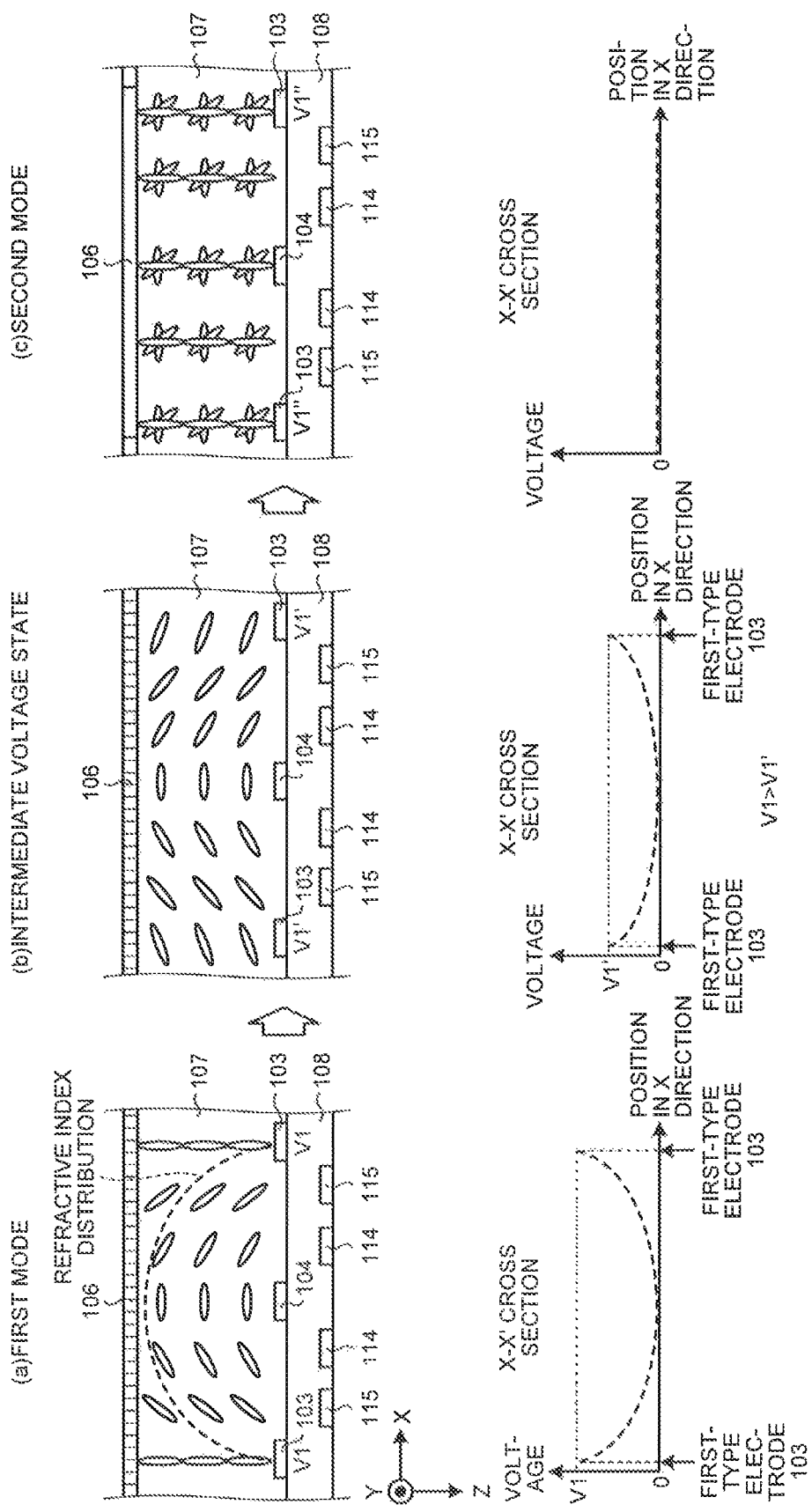
FIG. 15 is a diagram for explaining mode switching according to the first embodiment.

FIG. 15 is a schematic diagram for explaining the change in state of the optical element 10 when the mode is switched from the first mode to the second mode while focusing on the cross section in FIG. 5. When an input to specify the first mode is accepted, as illustrated in (a) of FIG. 15, the voltage controller 30 sets the mode to the first mode by controlling the voltage applied to each electrode in such a way that: the first voltage V1 applied to the first-type electrode 103 corresponding to the ends of the lens formed in the first mode exhibits the maximum value; closer the electrode to the second-type electrode 104 corresponding to the center of the lens, lower is the voltage applied thereto; and the voltage applied to the second-type electrode 104 exhibits the minimum value. Here, the voltage applied to the upper electrode functioning as the ground side is controlled to 0 V, the first voltage V1 applied to the first-type electrodes 103 is controlled to 6 V, and the voltage applied to the second-type electrode 104 is controlled to 0 V. In this case, moreover, the voltage controller 30 transmits to the display controller 40 the mode information which specifies the first mode. The display controller 40 having received the mode information controls the display 20 to display a parallax image to be displayed in the first mode.

Next, when an input to specify the second mode is accepted while being in the first mode, the voltage controller 30 sets the voltage state to the intermediate voltage state by controlling the voltage applied to the first-type electrode 103 to the second voltage V1' that is lower than the first voltage V1, as illustrated in (b) of FIG. 15. The voltage controller 30 makes it easier for the mode to be switched to the second mode by decreasing the voltage applied to the first-type electrodes 103 from the first voltage V1 to the voltage with which the misorientation of the liquid crystals is alleviated, namely, the voltage with which the orientation of the liquid crystals is stabilized (4 V in this example). Here, the voltage applied to the upper electrode functioning as the ground side is controlled to 0 V, while the second voltage V1' applied to the first-type electrodes 103 is controlled to 4 V. In this case, moreover, the voltage controller 30 transmits to the display controller 40 mode information which specifies the intermediate voltage state. The display controller 40 having received the mode information controls the display 20 to display an image to be displayed in the intermediate voltage state. The image to be displayed in the intermediate voltage state may be arbitrarily set, but may be a "black" image, for example.

After setting to the intermediate voltage state, the voltage controller 30 controls the voltage applied to each electrode to form the lens illustrated in FIG. 10, thereby setting the mode to the second mode. Here, as illustrated in (c) of FIG. 15, the voltage applied to the lower electrode (the first-type electrode 103, the second-type electrode 104, the fourth-type electrode 114, and the fifth-type electrode 115) functioning as the ground side is controlled to 0 V, while the voltage applied to the upper electrode is controlled as illustrated in FIG. 11. In this case, the voltage controller 30 transmits to the display controller 40 mode information which specifies the second mode. The display controller 40 having received the mode information controls the display 20 to display a parallax image to be displayed in the second mode.

As described above, in the intermediate voltage state that is set when the mode is switched from the first mode to the second mode, the voltage controller 30 of the present embodiment controls the voltage applied to the first-type electrode 103, to which the first voltage V1 that is the maximum voltage among voltages applied to each electrode is applied in the first mode, to the second voltage V1' that is lower than the first voltage V1. Therefore, the vertical electric field generated from the first-type electrode 103 can be weaken and the effect (shock) can be given to the liquid crystals in the vicinity of the first-type electrode 103 to have the orientation different from that in the first mode. As a result, the electric field pattern in the first mode is altered so that the orientation of the liquid crystals in the vicinity of the first-type electrode 103 is more easily stabilized. That is, in the present embodiment, the second mode is set after resetting the misorientation of the liquid crystals generated in the first mode, so that the switching speed can be increased in switching the distribution from the refractive index distribution corresponding to the first mode to the refractive index distribution corresponding to the second mode. In the aforementioned example, the "first mode" in the embodiment corresponds to a "first voltage state" in claims while the "second mode" in the embodiment corresponds to a "second voltage state" in claims.

Note that while there has been described the case where the mode is switched from the first mode to the second mode, the voltage controller 30 in switching the mode from the second mode to the first mode is adapted likewise to set the mode to the first mode after setting the state of voltage applied to the optical element 10 from the second mode to an intermediate voltage state (referred to as a second intermediate voltage state to be distinguished from the aforementioned intermediate voltage state). When setting to the second intermediate voltage state, the voltage controller 30 controls the voltage applied to the third-type electrodes 106 (the third-type electrodes 106 arranged to correspond to the ends of the lens formed in the second mode), to which the maximum voltage among voltages applied to each electrode is applied in the second mode, to voltage lower than the maximum voltage applied in the second mode. In this case, the "second mode" in the embodiment corresponds to the "first voltage state" in claims while the "first mode" in the embodiment corresponds to the "second voltage state" in claims.

Modifications of the first embodiment will now be described. The following modifications can be combined at will.

First Modification of First Embodiment

While there has been described in the first embodiment the example of using a positive-type liquid crystals in which the liquid crystal molecules rise (θtilt=0 degree) with the application of the voltage exceeding the threshold voltage Vth with which the liquid crystal molecules rise, there can also be used a negative-type liquid crystal in which the liquid crystal molecules fall down (θtilt=90 degrees) with the application of voltage exceeding the threshold voltage Vth, for example. In this case, the highest voltage is applied to an electrode arranged at a position corresponding to the center of a lens formed in a first mode or a second mode. In an intermediate voltage state set when the mode is switched from the first mode to the second mode, for example, the voltage controller 30 controls voltage applied to a second-type electrode 104 arranged at a position corresponding to the center of the lens formed in the first mode to a value lower than voltage applied to the second-type electrode 104 in the first mode.

Second Modification of First Embodiment

While there has been described the example in the first embodiment in which the liquid crystal layer 107 is used as a refractive index modulation layer in which the refractive index distribution changes according to the applied voltage, a birefringence polymer or the like may also be used as the refractive index modulation layer. In short, the refractive index modulation layer may be one in which the refractive index distribution changes according to the applied voltage.

Third Modification of First Embodiment

Figure 16:
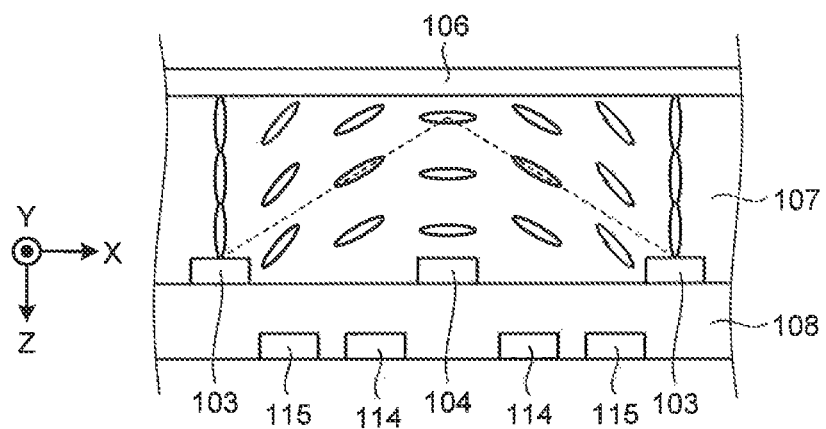
FIG. 16 is a cross-sectional view of an optical element according to a modification.

While there is formed in the first embodiment the first lens array in which the lens with the ridgeline direction extending in the Y-Y' direction in FIG. 4 is periodically arranged in the X-X' direction in FIG. 4 in the first mode, the content of the first mode can be arbitrarily set. The first mode may be configured where voltage applied to each electrode is controlled in such a way that a prism illustrated in FIG. 16 is arranged periodically (such that a prism array is formed), for example. A total area of misorientation can be reduced by forming the prism array only in a required region according to a desired optical characteristic, for example.

Figure 17:
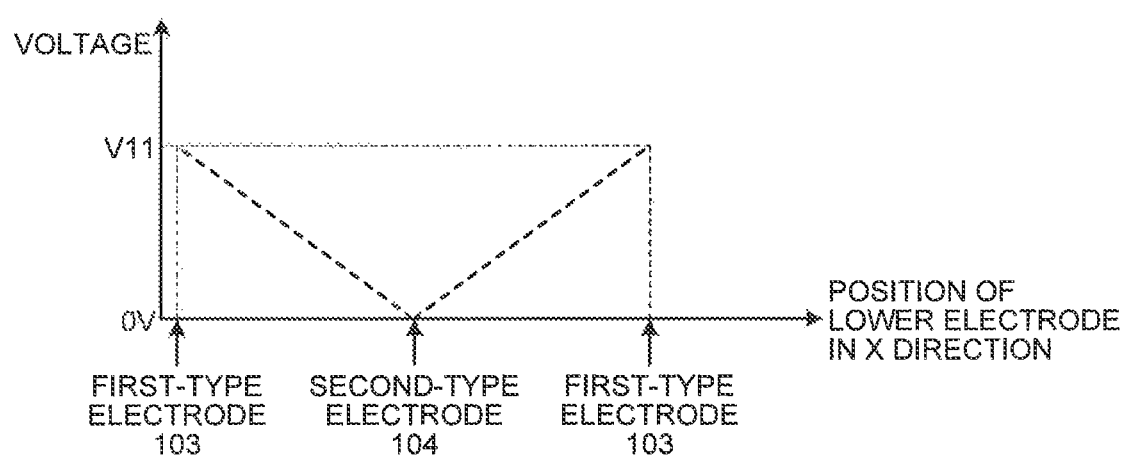
FIG. 17 is a diagram illustrating a voltage pattern according to a modification.
Figure 18:
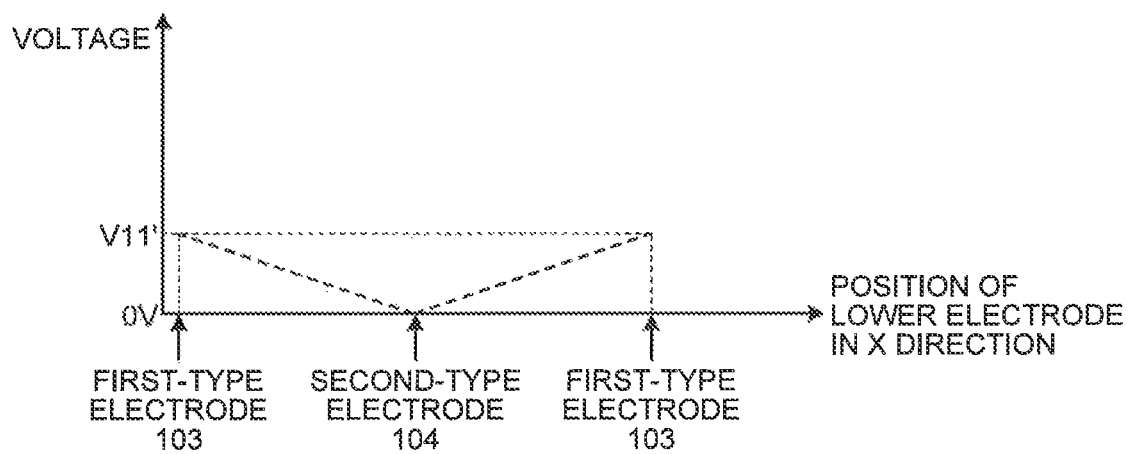
FIG. 18 is a diagram illustrating a voltage pattern according to a modification.

FIG. 16 illustrates an example in which one of two adjacent first-type electrodes 103 is arranged at a position corresponding to one end of one prism of the prism array formed in the first mode, while another one of the two adjacent first-type electrodes 103 is arranged at a position corresponding to another end of the prism. A second-type electrode 104 arranged between the two adjacent first-type electrodes 103 is arranged at a position corresponding to the center of the prism. In the example illustrated in FIG. 26, the voltage applied to the first-type electrodes 103 arranged at the positions corresponding to the ends of the prism exhibits a maximum value V11 in the first mode, as illustrated in FIG. 17. In an intermediate voltage state set when the mode is switched from the first mode to a second mode, the voltage controller 30 controls voltage applied to the first-type electrodes 103 to a voltage V11' that is lower than the voltage V11, as illustrated in FIG. 18. The effect similar to that in the first embodiment can be obtained as a result.

Figure 19:
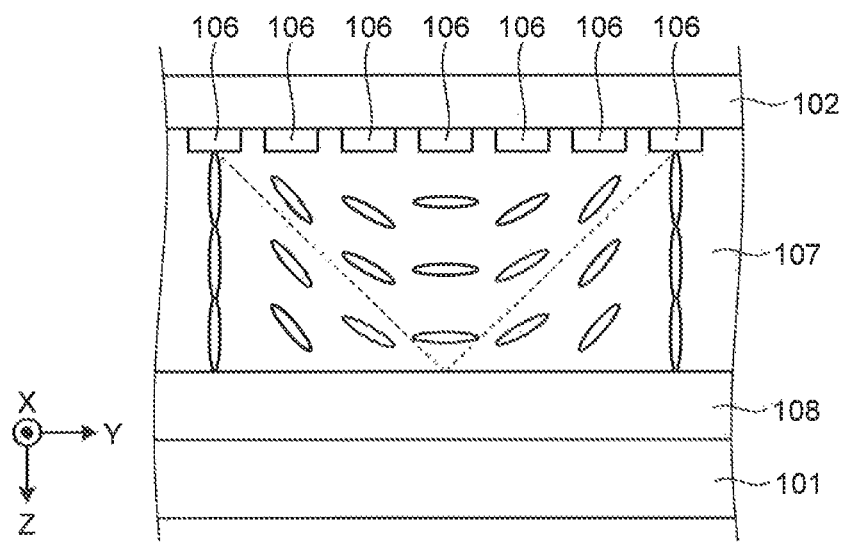
FIG. 19 is a cross-sectional view of the optical element according to a modification.
Figure 20:
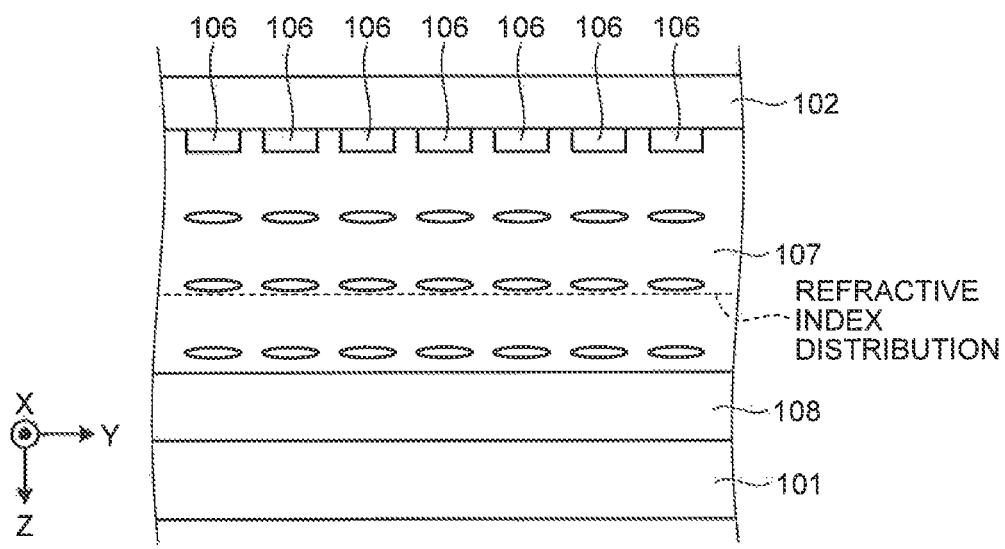
FIG. 20 is a cross-sectional view of the optical element according to a modification.

Likewise, the content of the second mode can be arbitrarily set. The second mode may be configured where voltage applied to each electrode is controlled such that a prism illustrated in FIG. 19 is arranged periodically, for example. Moreover, as illustrated in FIG. 20, the second mode may be configured where voltage applied to each electrode is controlled such that a refractive index distribution with a constant refractive index can be achieved, for example. In this case, the polarization perpendicular to a direction of a liquid crystal director is incident on an optical element 10 through which a light beam is not refracted, whereby a viewer can view an image as it is on a display 20 on the back of the optical element 10. That is, the image is in a 2D display in this case. In this case, however, the mode is set to the intermediate voltage state when switched from the first mode to the second mode, but is not set to the intermediate voltage state when switched from the second mode to the first mode. This is because there is no meaning to provide the intermediate voltage state when switching the mode from the second mode to the first mode in which the refractive index distribution in the second mode here does not have a gradient, meaning that the misorientation of the liquid crystals is less likely to be generated as high voltage is not applied to any specific electrode. That is, the intermediate voltage state is set when the mode is switched from a mode, in which the refractive index distribution with a gradient refractive index in the liquid crystal layer 107 is periodically arranged in at least a part of the optical element 10, to another mode (the type of the mode is irrelevant). In the intermediate voltage state, the voltage applied to a first-type electrode, to which a first voltage that is the maximum value in the mode in which the refractive index distribution with the gradient refractive index is periodically arranged is applied, may be controlled to a second voltage that is lower than the first voltage. Note that the type of the gradient may be set at will to the one where the refractive index changes (increases or decreases) along a curve as illustrated in the example in FIGS. 5 and 10 or the one where the refractive index changes (increases or decreases) linearly as illustrated in the example in FIGS. 16 and 19.

Fourth Modification of First Embodiment

Figure 21:
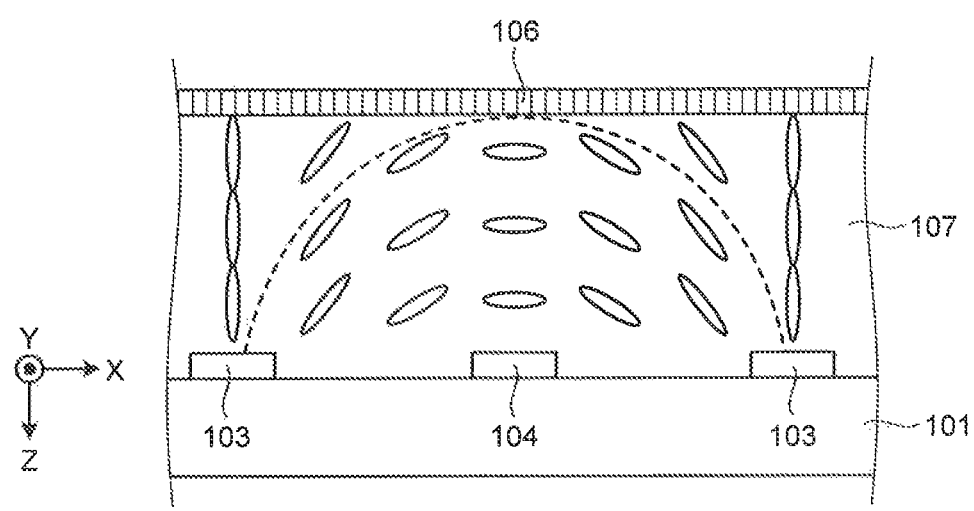
FIG. 21 is a cross-sectional view of the optical element according to a modification.

The electrode structure can be arbitrarily modified. While there will be described a modification of the structure of the lower electrode, the structure of the upper electrode can be modified in the similar manner as well. As illustrated in FIG. 5, the seven electrodes (one second-type electrode 104, two first-type electrodes 103, two fourth-type electrodes 114, and two fifth-type electrodes 115) are used to form one lens of the first lens array formed in the first mode in the first embodiment. However, three electrodes as illustrated in FIG. 21 can be used to form the one lens of the first lens array formed in the first mode as well. A dielectric layer 108, a fourth-type electrode 114, and a fifth-type electrode 115 are not provided in an example illustrated in FIG. 21 where a first-type electrode 103 and a second-type electrode 104 are directly formed on a surface of a first substrate 101 on the side of a liquid crystal layer 107. According to the configuration in FIG. 21, the electrode structure can be simplified while at the same time the voltage control performed on each electrode is made easy. Moreover, a cost reduction can be achieved as there is a fewer number of electrode patterns.

Figure 22:
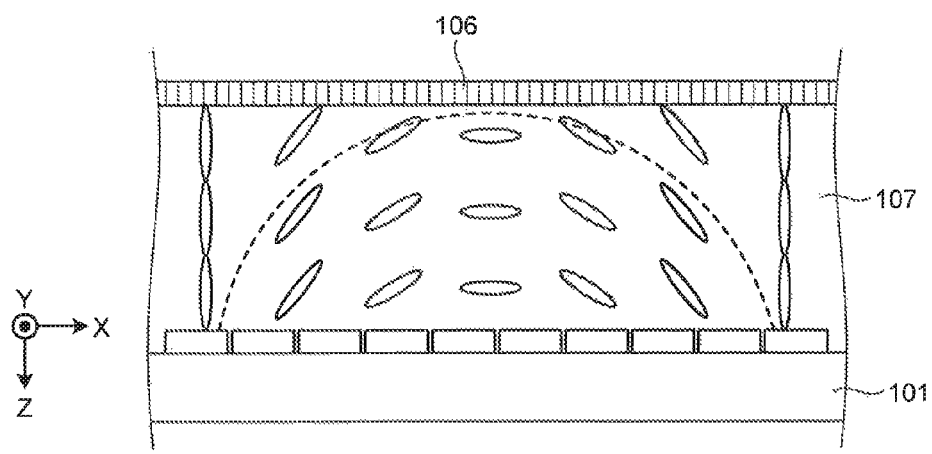
FIG. 22 is a cross-sectional view of the optical element according to a modification.

Furthermore, as illustrated in an example in FIG. 22, seven or more electrodes (10 electrodes in the example illustrated in FIG. 22) can be used to form the one lens of the first lens array formed in the first mode as well. FIG. 22 illustrates the example where the 10 electrodes used to form the one lens are closely arranged on the surface of the first substrate 101 on the side of the liquid crystal layer 107 within the bounds of not establishing a short circuit. According to the configuration in FIG. 22, a voltage pattern (distribution of an electric field) can be controlled minutely to be able to improve the precision of the refractive index distribution being formed.

Figure 23:
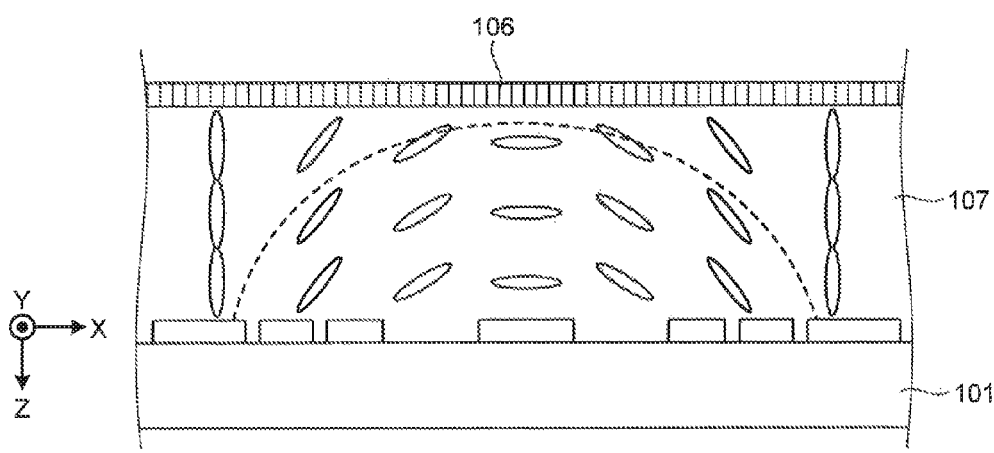
FIG. 23 is a cross-sectional view of the optical element according to a modification.

Furthermore, as illustrated in an example in FIG. 23, there may be provided a configuration where a plurality of electrodes used to form the one lens of the first lens array formed in the first mode is arranged on the surface of the first substrate 101 on the side of the liquid crystal layer 107 at an unequal interval. Electrodes in the vicinity of positions corresponding to ends of the lens formed in the first mode can be arranged on the surface of the first substrate 101 on the side of the liquid crystal layer 107 at a smaller interval than an interval at which electrodes at other positions are arranged, for example. In other words, with respect to a region where the misorientation of liquid crystals is more likely to be generated, the electrodes are arranged at a smaller interval to be able to control the distribution of the electric field more minutely, whereby the misorientation is alleviated more easily.

Fifth Modification of First Embodiment

There may be provided a configuration where one of a lower electrode and an upper electrode is made to function as a ground side in both first mode and second mode, for example. In other words, there may be provided a configuration where a display is not switched between vertical/horizontal orientations. In this case as well, the content of each of the first mode and the second mode can be arbitrarily set. Voltage applied to each electrode may be controlled in order to form a lens array in which a lens is periodically arranged in the first mode, and to achieve a refractive index distribution with a fixed refractive index in the second mode, for example. Moreover, in the second mode, the voltage applied to each electrode may be controlled in order to form a lens array in which a lens with a lens pitch different from a lens pitch of the lens formed in the first mode is periodically arranged, for example. Furthermore, in the second mode, the voltage applied to each electrode may be controlled to form a prism array in which a prism is periodically arranged, for example. The same can be said of the first mode. In this case, moreover, an electrode (referred to as a "counter electrode") functioning as a ground side may be formed of a single plate-like electrode facing each of a plurality of electrodes functioning as a power supply side.

Furthermore, the electrode may be arranged on only one of the first substrate 101 and the second substrate 102 in the configuration where the display is not switched between vertical/horizontal orientations, for example. In short, the electrode used to apply voltage to the liquid crystal may be provided on at least one of the first substrate 101 and the second substrate 102 facing each other.

Second Embodiment

Next, the second embodiment will be described. In the present embodiment, the misorientation of liquid crystals is reset by using the horizontal electric field generated between an electrode, to which the maximum voltage is applied in an immediately preceding mode, and an electrode adjacent to that electrode when a mode is set to an intermediate voltage state. Explained below is a case in which a mode immediately preceding the intermediate voltage state corresponds to the aforementioned first mode, but it is possible to think in the same manner as in a case in which the mode immediately preceding the intermediate voltage state corresponds to the aforementioned second mode. There will be described mainly what is different from the first embodiment.

Figure 24:
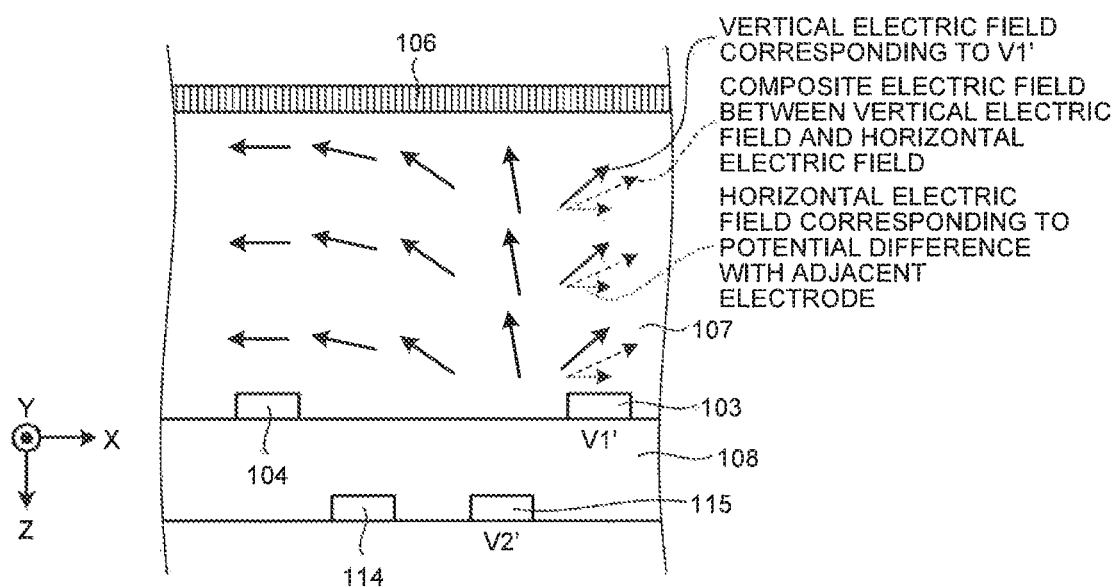
FIG. 24 is a cross-sectional view of an optical element according to second embodiment.

As illustrated in FIG. 24, in the intermediate voltage state, the voltage controller 30 of the present embodiment controls voltage applied to first-type electrode 103 to a second voltage V1' lower than a first voltage V1 and controls voltage (referred to as a "third voltage") applied to an electrode adjacent to the first-type electrode 103 to a voltage V2' different from the second voltage V1'. The electrode adjacent to the first-type electrode 103 is a fifth-type electrode 115 in this example, and the fifth-type electrode 115 corresponds to a "second-type electrode" in claims. The first-type electrode 103 in this example corresponds to a "first-type electrode" in claims. By generating a potential difference between the first-type electrode 103 and the fifth-type electrode 115, there acts on the liquid crystals in the vicinity of the first-type electrode 103 the vertical electric field generated according to the voltage V1' applied to the first-type electrode 103 as well as the horizontal electric field (an electric field acting in an X direction) generated according to the potential difference between the first-type electrode 103 and the fifth-type electrode 115. As a result, an effect (shock) to cause an orientation different from that in the first mode can be given to the liquid crystals in the vicinity of the first-type electrode 103 so that the electric field pattern in the first mode is altered to be able to more easily stabilize the orientation state of the liquid crystals in the vicinity of the first-type electrode 103. An advantage in the present embodiment is that the electric field pattern in the first mode can be more easily altered by working the horizontal electric field in addition to the vertical electric field. Note that in the intermediate voltage state, the relationship between the second voltage V1' applied to the first-type electrode 103 and the third voltage V2' applied to the fifth-type electrode 115 may be set to be able to reset the misorientation of the liquid crystals generated in the vicinity of the first-type electrode 103 in the first mode. Such a relationship can be arbitrarily set.

Figure 25:
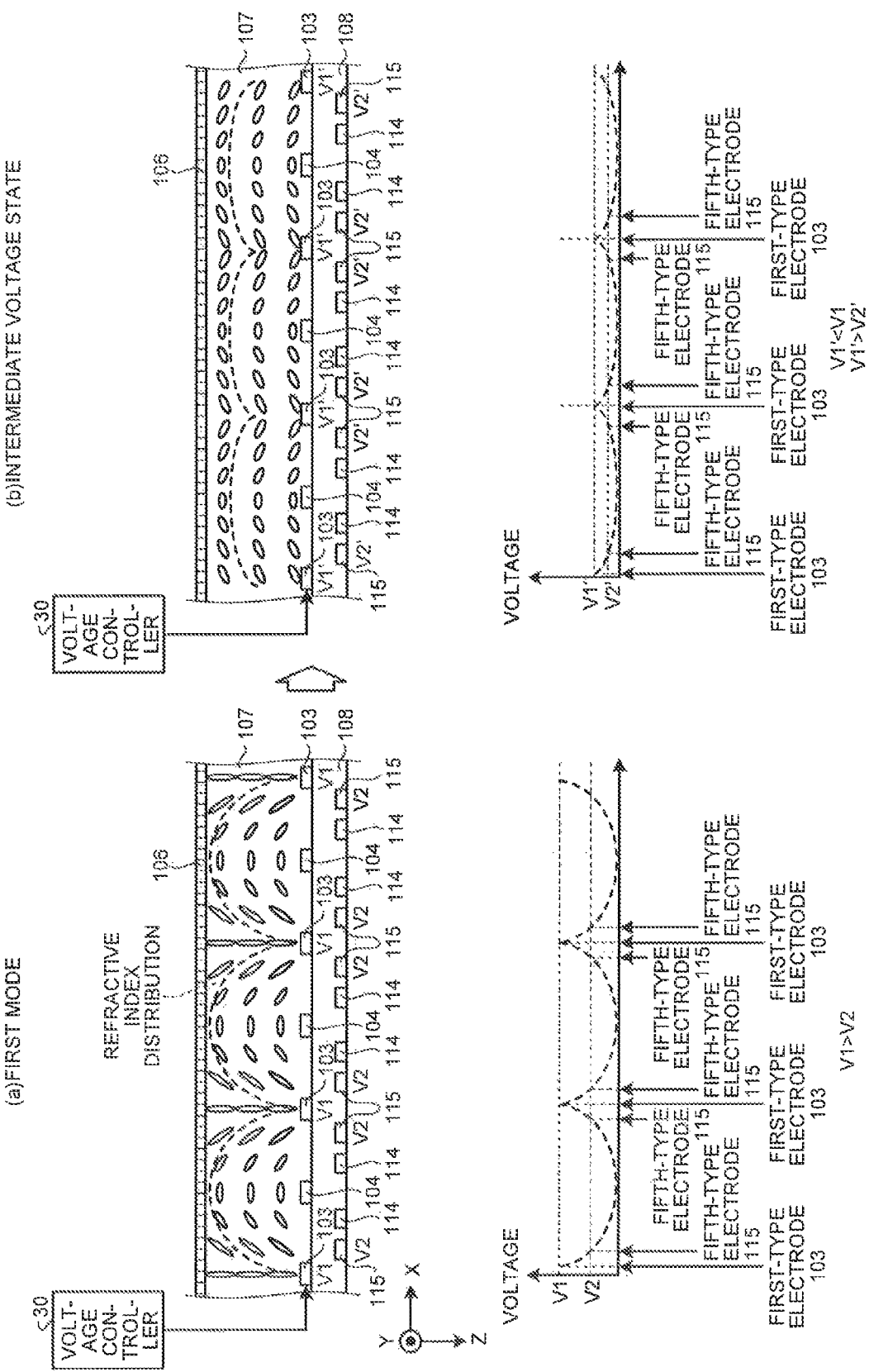
FIG. 25 is a diagram for explaining mode switching according to the second embodiment.

FIG. 25 is a schematic diagram for explaining states of an optical element 10 in the first mode and the intermediate voltage state. When setting to the first mode, the voltage controller 30 controls voltage applied to each electrode as illustrated in (a) of FIG. 25 in such a way that: the first voltage V1 applied to the first-type electrodes 103 corresponding to ends of a lens formed in the first mode exhibits the maximum value; closer the electrode to a second-type electrode 104 corresponding to the center of the lens, lower is the voltage applied thereto; and the voltage applied to the second-type electrode exhibits the minimum value. In this example, the voltage applied to the fifth-type electrode 115 in the first mode (referred to as a "fourth voltage") is controlled to a voltage V2 that is lower than the first voltage V1.

As illustrated in (b) of FIG. 25, when setting to the intermediate voltage state, the voltage controller 30 controls the second voltage V1' applied to the first-type electrode 103 to a value lower than the first voltage V1 and controls the third voltage V2' applied to the fifth-type electrode 115 to a value lower than the second voltage V1'. Not only the vertical electric field but also the horizontal electric field can be made to act on the liquid crystals in the vicinity of the first-type electrode 103 by generating a potential difference between the first-type electrode 103 and the fifth-type electrode 115 in the intermediate voltage state. Accordingly, a shock (shock in a direction different from that in the first mode) given to the liquid crystals in the vicinity of the first-type electrode 103 can be increased. The orientation state of the liquid crystal can be more easily stabilized as a result.

Modifications of the second embodiment will now be described. The following modifications can be arbitrarily combined.

First Modification of Second Embodiment

The voltage applied in an intermediate voltage state may be controlled such that a relationship between a second voltage V1' applied to a first-type electrode 103 and a third voltage V2' applied to a fifth-type electrode 115 satisfies V1'<V2', for example. FIG. 26 is a diagram for explaining the relationship between the position of a lower electrode in an X direction and voltage applied to the lower electrode in a first mode and the intermediate voltage state. As illustrated in (a) of FIG. 26, when setting to the first mode, the voltage controller 30 controls voltage applied to each electrode in such a way that: a first voltage V1 applied to the first-type electrodes 103 corresponding to ends of a lens formed in the first mode exhibits the maximum value; closer an electrode to a second-type electrode 104 corresponding to the center of the lens, lower is the voltage applied thereto; and the second-type electrode 104 exhibits the minimum value. In this example, a fourth voltage V2 applied to a fifth-type electrode 115 in the first mode is controlled to a value that is lower than the first voltage V1.

As illustrated in (b) of FIG. 26, when setting to the intermediate voltage state, the voltage controller 30 controls a second voltage V1' applied to the first-type electrode 103 to a value lower than the first voltage V1 and controls a third voltage V2' applied to the fifth-type electrode 115 to a value higher than the second voltage V1'. In the intermediate voltage state, a potential difference between the first-type electrode 103 and the fifth-type electrode 115 adjacent to each other can be generated by controlling the third voltage V2' applied to the fifth-type electrode 215 to be higher than the second voltage V1' applied to the first-type electrode 103. The effect of the horizontal electric field working from the fifth-type electrode 115 toward the first-type electrode 103 is thus increased to be able to increase a shock (shock in a direction different from that in the first mode) given to a liquid crystals in the vicinity of the first-type electrode 103. The orientation of the liquid crystals can be more easily stabilized as a result.

Second Modification of Second Embodiment

It is preferred that a relationship between a second voltage V1' applied to a first-type electrode 103 and a third voltage V2' applied to a fifth-type electrode 115 in an intermediate voltage state be set to be able to achieve the largest change in an electric field in the vicinity of the first-type electrode 103. Considering the time it takes for a liquid crystal to respond, for example, a rising time $t_{off}$ of the liquid crystal can be expressed by Expression (4) given below. In Expression (4) given below, "γ" represents a rotational viscosity coefficient of the liquid crystal, "d" represents the thickness of the liquid crystal, and "K" represents an elastic constant of the liquid crystal.

$$t_{off} = \frac{\gamma d^2}{\pi^2 K} \quad (4)$$

There occurs a transition period during which the orientation of the liquid crystals undergoes a change, when the time for which voltage is applied to each electrode (voltage application time) is within the rising time $t_{off}$ in the intermediate voltage state. That is, a potential difference can be temporarily generated between the first-type electrode 103 and the fifth-type electrode 115 by controlling the voltage application time to fall within the rising time $t_{off}$ even when the second voltage V1' applied to the first-type electrode 103 and the third voltage V2' applied to the fifth-type electrode 115 are controlled to have the same value in the intermediate voltage state. As a result, the horizontal electric field can be made to temporarily act on the liquid crystals in the vicinity of the first-type electrode 103.

Third Modification of Second Embodiment

Where an absolute value of a difference between a first voltage V1 applied to a first-type electrode 103 and a fourth voltage V2 applied to a fifth-type electrode 115 in a first mode is smaller than the fourth voltage V2, for example, the voltage controller 30 can control a third voltage V2' applied to the fifth-type electrode 115 in an intermediate voltage state to a value lower than the fourth voltage V2. A voltage condition in this case can be expressed by Expression (5) given below.

$$|V1-V2|<V2 \quad (5)$$

In this case, a strong vertical electric field is considered to be acting in the vicinity of (typically directly above) the fifth-type electrode 115 as well in the first mode so that, in the intermediate voltage state, the orientation of liquid crystals in the vicinity of the fifth-type electrode 115 can be stabilized by decreasing the voltage applied to the fifth-type electrode 115 to a value lower than that in the first mode.

FIG. 27 is a diagram for explaining a correspondence between the position of a lower electrode in an X direction and voltage applied to the lower electrode in the first mode and the intermediate voltage state. As illustrated in (a) of FIG. 27, when setting to the first mode, the voltage controller 30 controls voltage applied to each electrode in such a way that: the first voltage V1 applied to the first-type electrodes 103 corresponding to ends of a lens formed in the first mode exhibits the maximum value; closer an electrode to a second-type electrode 104 corresponding to the center of the lens, lower is the voltage applied thereto; and the voltage applied to the second-type electrode 104 exhibits the minimum value. In this example, the fourth voltage V2 applied to the fifth-type electrode 115 in the first mode is set to a value lower than the first voltage V1, and the absolute value |V1−V2| of the difference between the first voltage V1 and the fourth voltage V2 is smaller than the fourth voltage V2. In other words, the voltage condition expressed by Expression (5) is satisfied.

As illustrated in (b) of FIG. 27, when setting to the intermediate voltage state, the voltage controller 30 controls the voltage applied to the first-type electrode 103 to a second voltage V1' that is lower than the first voltage V1, and controls the third voltage V2' applied to the fifth-type electrode 115 to a value that is lower than the fourth voltage V2 and higher than the second voltage V1'.

As described above, the orientation of the liquid crystals in the vicinity of the fifth-type electrode 115 can be stabilized by decreasing the third voltage V2' applied to the fifth-type electrode 115 in the intermediate voltage state to be lower than the fourth voltage V2 applied to the fifth-type electrode 115 in the first mode. Moreover, as with the second embodiment, the potential difference is caused to be generated between the first-type electrode 103 and the fifth-type electrode 115 in the intermediate voltage state to be able to make not only the vertical electric field but also the horizontal electric field act on the liquid crystals in the vicinity of the first-type electrode 103 prone to the misorientation in the first mode, whereby the orientation of the liquid crystals in the vicinity of the first-type electrode 103 can be more easily stabilized. The aforementioned example illustrates the case where it is preferred to increase the effect of the horizontal electric field working from the fifth-type electrode 115 toward the first-type electrode 103 in the intermediate voltage state in order to alter the electric field pattern in the first mode. When it is more effective to increase the effect of the horizontal electric field working from the first-type electrode 103 toward the fifth-type electrode 115 in order to alter the electric field pattern in the first mode, however, the third voltage V2' can be controlled to a value that is lower than the fourth voltage V2 and the second voltage V1', for example.

Fourth Modification of Second Embodiment

Where an absolute value of a difference between a first voltage V1 applied to a first-type electrode 103 and a fourth voltage V2 applied to a fifth-type electrode 115 is larger than the fourth voltage V2 in a first mode, for example, the voltage controller 30 can control a third voltage V2' applied to the fifth-type electrode 115 to a value higher than the fourth voltage V2 in an intermediate voltage state. A voltage condition in this case can be expressed by Expression (6) given below.

$$|V1-V2|>V2 \tag{6}$$

FIG. 28 is a diagram for illustrating the relationship between the position of a lower electrode in an X direction and voltage applied to the lower electrode in the first mode and the intermediate voltage state. As illustrated in (a) of FIG. 28, when setting to the first mode, the voltage controller 30 controls voltage applied to each electrode in such a way that: the first voltage V1 applied to the first-type electrodes 103 corresponding to ends of a lens formed in the first mode exhibits the maximum value; closer an electrode to a second-type electrode 104 corresponding to the center of the lens, lower the voltage applied thereto; and the voltage applied to the second-type electrode 104 exhibits the minimum value. In this example, a fourth voltage V2 applied to a fifth-type electrode 115 in the first mode is controlled to a value that is lower than the first voltage V1. The absolute value |V1−V2| of the difference between the first voltage V1 and the fourth voltage V2 is larger than the fourth voltage V2. In other words, the voltage condition expressed by Expression (6) is satisfied.

As illustrated in (b) of FIG. 28, when setting to the intermediate voltage state, the voltage controller 30 controls the voltage applied to the first-type electrode 103 to a second voltage V1' that is lower than the first voltage V1, and controls the third voltage V2' applied to the fifth-type electrode 115 to a value that is higher than the fourth voltage V2 and the second voltage V1'.

In the aforementioned example, there is room to increase the voltage applied to the fifth-type electrode 115 in the intermediate voltage state since the fourth voltage V2 is sufficiently lower than the first voltage V1. Since the fourth voltage V2 is sufficiently lower than the first voltage V1, the potential difference between the first-type electrode 103 and the fifth-type electrode 115 is generated by controlling the third voltage V2' to a value higher than the fourth voltage V2 to be able to increase the effect of the horizontal electric field on the first-type electrode 103 and thus alter the electric field pattern in the vicinity of the first-type electrode 103 in the first mode. The aforementioned example illustrates the case where it is preferred to increase the effect of the horizontal electric field working from the fifth-type electrode 115 toward the first-type electrode 103 in the intermediate voltage state. When it is more effective to increase the effect of the horizontal electric field working from the first-type electrode 103 toward the fifth-type electrode 115 in order to alter the electric field pattern in the first mode, however, the third voltage V2' can be controlled to a value that is higher than the fourth voltage V2 and lower than the second voltage V1', for example.

Fifth Modification of Second Embodiment

The voltage controller 30 can control an absolute value of a difference between a first voltage V1 and a second voltage V1' to be larger than an absolute value of a difference between a third voltage V2' and a fourth voltage V2, for example. A voltage condition in this case can be expressed by Expression (7) given below.

$$|V1-V1'| \geq |V2-V2'| \tag{7}$$

FIG. 29 is a diagram for explaining a correspondence between the position of a lower electrode in an X direction and voltage applied to the lower electrode in a first mode and an intermediate voltage state. As illustrated in (a) of FIG. 29, when setting to the first mode, the voltage controller 30 controls voltage applied to each electrode in such a way that: the first voltage V1 applied to a first-type electrodes 103 corresponding to ends of a lens formed in the first mode exhibits the maximum value; closer an electrode to a second-type electrode 104 corresponding to the center of the lens, lower the voltage applied thereto; and the voltage applied to the second-type electrode 104 exhibits the minimum value. In the first mode, the fourth voltage V2 applied to a fifth-type electrode 115 adjacent to the first-type electrode 103 is controlled to a value that is lower than the first voltage V1.

As illustrated in (b) of FIG. 29, when setting to the intermediate voltage state, the voltage controller 30 controls the second voltage V1' applied to the first-type electrode 103 to a value that is lower than the first voltage V1, and controls the third voltage V2' applied to the fifth-type electrode 115 to a value that is lower than the fourth voltage V2. The third voltage V2' is controlled to the value lower than the second voltage V1' in this example. The voltage controller 30 then performs control such that the absolute value of the difference between the first voltage V1 and the second voltage V1' is larger than the absolute value of the difference between the third voltage V2' and the fourth voltage V2. In the aforementioned example as well, the potential difference is generated between the first-type electrode 103 and the fifth-type electrode 115 in the intermediate voltage state so that the vertical electric field generated according to the voltage V1' applied to the first-type electrode 103 as well as the horizontal electric field generated according to the potential difference between the first-type electrode 103 and the fifth-type electrode 115 are made to act on the liquid crystals in the vicinity of the first-type electrode 103. As a result, an effect (shock) to cause an orientation different from that in the first mode can be given to the liquid crystals in the vicinity of the first-type electrode 103 so that the electric field pattern in the first mode is altered to be able to more easily stabilize the orientation state of the liquid crystals in the vicinity of the first-type electrode 103.

Sixth Modification of Second Embodiment

Here, voltage applied to a fourth-type electrode 114 adjacent to a fifth-type electrode 115 in a first mode is expressed as a fifth voltage V3, while voltage applied to the fourth-type electrode 114 in an intermediate voltage state is expressed as a sixth voltage V3'. The voltage controller 30 can perform control to satisfy a voltage condition expressed by Expression (8) given below.

$$\frac{|V1 - V1'|}{|V2 - V2'|} \geq \frac{|V2 - V2'|}{|V3 - V3'|} \qquad (8)$$

FIG. 30 is a diagram for explaining a correspondence between the position of a lower electrode in an X direction and voltage applied to the lower electrode in the first mode and the intermediate voltage state. As illustrated in (a) of FIG. 30, when setting to the first mode, the voltage controller 30 controls voltage applied to each electrode in such a way that: a first voltage V1 applied to a first-type electrodes 103 corresponding to ends of a lens formed in the first mode exhibits the maximum value; closer an electrode to a second-type electrode 104 corresponding to the center of the lens, lower is the voltage applied thereto; and the voltage applied to the second-type electrode 104 exhibits the minimum value. In the first mode, the fourth voltage V2 applied to a fifth-type electrode 115 adjacent to the first-type electrode 103 is controlled to a value that is lower than the first voltage V1. Moreover, the fifth voltage V3 applied to the fourth-type electrode 114 adjacent to the fifth-type electrode 115 is controlled to a value lower than the fourth voltage V2.

As illustrated in (b) of FIG. 30, when setting to the intermediate voltage state, the voltage controller 30 controls a second voltage V1' applied to the first-type electrode 103 to a value that is lower than the first voltage V1, controls a third voltage V2' applied to the fifth-type electrode 115 to a value that is lower than the fourth voltage V2, and controls the sixth voltage V3' applied to the fourth-type electrode 114 to a value that is lower than the fifth voltage V3. The third voltage V2' is controlled to the value lower than the second voltage V1' while the sixth voltage V3' is controlled to the value lower than the third voltage V2' in this example. The voltage controller 30 in this example controls the voltage applied to each of the first-type electrode 103, the fifth-type electrode 115, and the fourth-type electrode 114 in order to satisfy the voltage condition expressed by Expression (8) given above. In this example, a potential difference is generated not only between the first-type electrode 103 and the fifth-type electrode 115 but also between the first-type electrode 103 and the fourth-type electrode 114 in the intermediate voltage state, whereby the interaction between the voltage is increased to be able to further increase the effect of the horizontal electric field. As a result, the electric field pattern in the first mode can be more easily altered, making it easier to stabilize the orientation of the liquid crystals in the vicinity of the first-type electrode 103.

Third Embodiment

Next, third embodiment will be described. As illustrated in FIG. 31, when setting to an intermediate voltage state in the present embodiment, the voltage controller 30 controls voltage applied to each electrode such that a phase of a voltage pattern in a first mode is shifted by a predetermined value ("Δϕ" in an example illustrated in FIG. 31). The intermediate voltage state can be set in the present embodiment by changing (shifting) only the phase without changing the voltage pattern in the first mode. The advantage of this is that the voltage control performed to set the intermediate voltage state is simplified.

Fourth Embodiment

Next, fourth embodiment will be described. The present embodiment is different from each of the aforementioned embodiments in that, when setting to an intermediate voltage state, the voltage controller 30 sets voltage applied to an electrode (counter electrode) functioning as a ground side in an immediately preceding mode to a value that is higher than a reference voltage and lower than the maximum voltage among voltages applied to the electrodes in the immediately preceding mode. Explained below is a case in which a mode immediately preceding the intermediate voltage state corresponds to the aforementioned first mode, but it is possible to think in the same manner as in a case in which the mode immediately preceding the intermediate voltage state corresponds to the aforementioned second mode.

As illustrated in FIG. 32, when setting to a first mode, the voltage controller 30 controls voltage applied to an upper electrode (the upper electrode corresponds to the counter electrode in this example) functioning as the ground side to 0 V and, on the other hand, periodically changes voltage applied to each of a plurality of lower electrodes functioning as a power supply side. In the first mode, as described above, the voltage applied to each electrode is controlled in such a way that: a first voltage V1 applied to first-type electrodes 103 corresponding to ends of a lens formed in the first mode exhibits the maximum value; closer an electrode to a second-type electrode 104 corresponding to the center of the lens, lower is the voltage applied thereto; and the voltage applied to the second-type electrode 104 exhibits the minimum value. In this embodiment, as illustrated in FIG. 32, when setting to the intermediate voltage state, the voltage controller 30 controls voltage applied to the first-type electrode 103 to a second voltage V1' that is lower than the first voltage V1, and controls voltage applied to the upper electrode to a voltage Vx that is higher than 0 V (an example of the reference voltage) and lower than the first voltage V1. The voltage Vx is applied to the upper electrode so that the vertical electric field generated according to the voltage Vx applied to the upper electrode acts on liquid crystals in the vicinity of the first-type electrode 103. That is, the electric field pattern in the first mode can be more easily altered because there acts, on the liquid crystals in the vicinity of the first-type electrode 103, the vertical electric field generated according to the voltage Vx applied to the upper electrode in addition to the vertical electric field generated according to the second voltage V1' applied to the first-type electrode 103 and the horizontal electric field generated according to a potential difference between the first-type electrode 203 and an electrode adjacent to that first-type electrode 103. Therefore, the orientation of the liquid crystals in the vicinity of the first-type electrode 103 is more easily stabilized according to the present embodiment.

The first embodiment is configured to switch the display between vertical/horizontal orientations, and is configured such that the direction to which the lower electrode extends is parallel to the Y direction while the direction to which the upper electrode extends is parallel to the X direction to be orthogonal to the Y direction. However, the configuration is not limited thereto.

Furthermore, while there has been described the case in each of the aforementioned embodiments where the lens function is periodically arranged in one direction in the first mode or the second mode, the lens may be arranged two-dimensionally in either mode. Either one of the modes may be configured to include a fly-eye lens array in which a convex lens (fly-eye lens) is arranged into a matrix, for example.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal lens device comprising:
an optical element including:
a refractive index modulation layer of which a refractive index distribution changes according to a voltage applied thereto; and
a plurality of electrodes to apply a voltage to the refractive index modulation layer; and
a voltage controller to:
when a state of voltage applied to the electrodes is in a first voltage state, control voltages applied to the electrodes in such a way that a first refractive index distribution is arranged periodically in at least a part of the optical element, the first refractive index distribution having a gradient refractive index of the refractive index modulation layer;
when the state of voltage is in a second voltage state different from the first voltage state, control voltages applied to the electrodes in such a way that a second refractive index distribution is achieved;
when the state of voltage is in an intermediate voltage state that is set when the voltage state is switched from the first voltage state to the second voltage state, control a voltage applied to a first-type electrode, to which a first voltage that is the maximum value among the voltages applied to the electrodes in the first voltage state is applied, to a second voltage lower than the first voltage; and
when the state of voltage is in the intermediate voltage state, control a voltage applied to a second-type electrode adjacent to the first-type electrode to a third voltage different from the second voltage.

2. The device according to claim 1, wherein the third voltage is lower than the second voltage.

3. The device according to claim 1, wherein the third voltage is higher than the second voltage.

4. The device according to claim 1, wherein, when an absolute value of a difference between the first voltage applied to the first-type electrode in the first voltage state and a fourth voltage applied to the second-type electrode in the first voltage state is smaller than the fourth voltage, the voltage controller controls the third voltage to a value lower than the fourth voltage.

5. The device according to claim 1, wherein, when an absolute value of a difference between the first voltage applied to the first-type electrode in the first voltage state and a fourth voltage applied to the second-type electrode in the first voltage state is larger than the fourth voltage, the voltage controller controls the third voltage to a value higher than the fourth voltage.

6. The device according to claim 1, wherein the voltage controller performs control in such a way that an absolute value of a difference between the first voltage and the second voltage is larger than an absolute value of a difference between the third voltage and a fourth voltage applied to the second-type electrode in the first voltage state.

7. The device according to claim 1, wherein when the state of voltage is in the intermediate voltage state, the voltage controller controls the voltage applied to the electrodes in such a way that a phase of a voltage pattern in the first voltage state is shifted by a predetermined value.

8. The device according to claim 1, wherein
the optical element further comprises a first substrate and a second substrate that are placed opposite to each other and that sandwich the refractive index modulation layer in between,
the plurality of electrodes is formed on a surface of the first substrate on a side of the refractive index modulation layer, while a plurality of counter electrode respectively facing the plurality of electrodes formed on the first substrate is formed on a surface of the second substrate on a side of the refractive index modulation layer,
when the state of voltage is in the first voltage state, the voltage controller controls voltages applied to the counter electrodes to be the same value and periodically changes the voltages applied to the plurality of electrodes formed on the first substrate, and
when the state of voltage is in the intermediate voltage state, the voltage controller controls the voltages applied to the counter electrodes to values higher than the voltages applied to the counter electrodes in the first voltage state and lower than the first voltage.

9. The device according to claim 1, wherein
the optical element further comprises a first substrate and a second substrate that are placed opposite to each other and that sandwich the refractive index modulation layer in between,
among the plurality of electrodes, electrodes extending in a first direction is formed on a surface of the first substrate on a side of the refractive index modulation layer, while electrodes extending in a second direction different from the first direction is formed on a surface of the second substrate on a side of the refractive index modulation layer,
when the state of voltage is in the first voltage state, the voltage controller controls voltages applied to the electrodes formed on the second substrate to be the same value and periodically changes voltage applied to the electrodes formed on the first substrate, and
when the state of voltage is in the second voltage state, the voltage controller controls voltages applied to the electrodes formed on the first substrate to be the same value and periodically changes voltage applied to the electrodes formed on the second substrate.

10. The device according to claim 9, wherein
when the state of voltage is in the first voltage state, the voltage controller controls the voltages applied to the electrodes in such a way that a first lens array is formed periodically in which a first lens with a ridgeline direction extending in the first direction is arranged, and
when the state of voltage is in the second voltage state, the voltage controller controls the voltage applied to the electrodes in such a way that a second lens array is formed periodically in which a second lens with a ridgeline direction extending in the second direction.

11. The device according to claim 10, wherein
when the state of voltage is in the first voltage state, the voltage controller controls the voltages applied to the electrodes in such a way that:
the voltages applied to the electrodes arranged at positions corresponding to ends of the first lens exhibits the maximum value;

closer an electrode to the electrode arranged at a position corresponding to a center of the first lens, lower is the voltage applied thereto; and the voltage applied to the electrode arranged at a position corresponding to the center of the first lens exhibits the minimum value, and when the state of voltage is in the second voltage state, the voltage controller controls the voltages applied to the electrodes in such a way that:

the voltage applied to the electrodes arranged at positions corresponding to edges of the second lens exhibits the maximum value;

closer an electrode to the electrode arranged at a position corresponding to a center of the second lens, lower is the voltage applied thereto; and the voltage applied to the electrode arranged at a position corresponding to the center of the second lens exhibits the minimum value.

12. The device according to claim 1, wherein the refractive index modulation layer is a liquid crystal layer including liquid crystal molecules and a dispersion medium which is used to disperse the liquid crystal molecules.

13. An image display apparatus comprising:
the liquid crystal lens device according to claim 1; and
a display that is provided on the back of the optical element to display an image.

14. A drive device that drives an optical element that includes:
a refractive index modulation layer of which a refractive index distribution changes according to a voltage applied thereto; and
a plurality of electrodes to apply a voltage to the refractive index modulation layer,
the drive device comprising:
a voltage controller to:
when a state of voltage applied to the electrodes is in a first voltage state, control voltages applied to the electrodes in such a way that a first refractive index distribution is arranged periodically in at least a part of the optical element, the first refractive index distribution having a gradient refractive index of the refractive index modulation layer;
when the state of voltage is in a second voltage state different from the first voltage state, control voltages applied to the electrodes in such a way that a second refractive index distribution is achieved;
when the state of voltage is in an intermediate voltage state that is set when the voltage state is switched from the first voltage state to the second voltage state, control a voltage applied to a first-type electrode, to which a first voltage that is the maximum value among the voltages applied to the electrodes in the first voltage state is applied, to a second voltage lower than the first voltage; and
when the state of voltage is in the intermediate voltage state, control a voltage applied to a second-type electrode adjacent to the first-type electrode to a third voltage different from the second voltage.

15. A drive method for driving an optical element that includes:
a refractive index modulation layer of which a refractive index distribution changes according to voltage applied thereto; and
a plurality of electrodes to apply a voltage to the refractive index modulation layer, and
the drive method comprising:
controlling, when a state of voltage applied to the electrodes is in a first voltage state, voltages applied to the electrodes in such a way that a first refractive index distribution is arranged periodically in at least a part of the optical element, the first refractive index distribution having a gradient refractive index of the refractive index modulation layer;
controlling, when the state of voltage is in a second voltage state different from the first voltage state, voltages applied to the electrodes in such a way that a second refractive index distribution is achieved;
controlling, when the state of voltage is in an intermediate voltage state that is set when the voltage state is switched from the first voltage state to the second voltage state, a voltage applied to a first-type electrode, to which a first voltage that is the maximum value among the voltages applied to the electrodes in the first voltage state is applied, to a second voltage lower than the first voltage; and
controlling, when the state of voltage is in the intermediate voltage state, a voltage applied to a second-type electrode adjacent to the first-type electrode to a third voltage different from the second voltage.

* * * * *